(12) United States Patent
Chowdhary et al.

(10) Patent No.: US 12,117,831 B2
(45) Date of Patent: *Oct. 15, 2024

(54) ADAPTIVE CYBER-PHYSICAL SYSTEM FOR EFFICIENT MONITORING OF UNSTRUCTURED ENVIRONMENTS

(71) Applicant: THE BOARD OF TRUSTEES OF THE UNIVERSITY OF ILLINOIS, Urbana, IL (US)

(72) Inventors: Girish Chowdhary, Champaign, IL (US); Chinmay P. Soman, Urbana, IL (US); Beau David Barber, Ogden, IL (US)

(73) Assignee: THE BOARD OF TRUSTEES OF THE UNIVERSITY OF ILLINOIS, Urbana, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/342,270

(22) Filed: Jun. 27, 2023

(65) Prior Publication Data

US 2024/0126258 A1    Apr. 18, 2024

Related U.S. Application Data

(63) Continuation of application No. 17/522,699, filed on Nov. 9, 2021, now Pat. No. 11,703,855, which is a
(Continued)

(51) Int. Cl.
*G05D 1/00* (2006.01)
*G06F 16/29* (2019.01)
(Continued)

(52) U.S. Cl.
CPC .......... *G05D 1/0038* (2013.01); *G06F 16/29* (2019.01); *G06F 18/2178* (2023.01);
(Continued)

(58) Field of Classification Search
CPC .. G05D 1/0038; G06F 16/29; G06K 9/00657; G06K 9/6263; G06K 2009/00644;
(Continued)

(56) References Cited

U.S. PATENT DOCUMENTS 5,890,441 A    4/1999   Swinson et al.
6,091,846 A *  7/2000   Lin ................... G01N 21/9501
                                                    257/E21.525
(Continued)

FOREIGN PATENT DOCUMENTS

CN    101963806 A    2/2011
CN    203486144 U    3/2014
(Continued)

OTHER PUBLICATIONS

Communication pursuant to Article 94(3) EPC, for EP Appln. No. 18741140.0, mailed Jun. 8, 2021.
(Continued)

*Primary Examiner* — Muhammad Shafi
(74) *Attorney, Agent, or Firm* — Guntin & Gust, PLC; Matthew Tropper

(57) ABSTRACT

The present disclosure provides a system for monitoring unstructured environments. A predetermined path can be determined according to an assignment of geolocations to one or more agronomically anomalous target areas, where the one or more agronomically anomalous target areas are determined according to an analysis of a plurality of first images that automatically identifies a target area that deviates from a determination of an average of the plurality of first images that represents an anomalous place within a predetermined area, where the plurality of first images of the predetermined area are captured by a camera during a flight over the predetermined area. A camera of an unmanned vehicle can capture at least one second image of the one or
(Continued)

more agronomically anomalous target areas as the unmanned vehicle travels along the predetermined path.

20 Claims, 20 Drawing Sheets

Related U.S. Application Data continuation of application No. 16/480,076, filed as application No. PCT/US2018/014695 on Jan. 22, 2018, now Pat. No. 11,199,838.

(60) Provisional application No. 62/449,439, filed on Jan. 23, 2017.

(51) Int. Cl.
| | |
|---|---|
| G06F 18/21 | (2023.01) |
| G06V 10/22 | (2022.01) |
| G06V 10/762 | (2022.01) |
| G06V 10/778 | (2022.01) |
| G06V 20/10 | (2022.01) |
| G06V 20/17 | (2022.01) |
| G08G 5/00 | (2006.01) |
| B64C 39/02 | (2023.01) |

(52) U.S. Cl.
CPC ............ *G06V 10/22* (2022.01); *G06V 10/763* (2022.01); *G06V 10/7784* (2022.01); *G06V 20/17* (2022.01); *G06V 20/188* (2022.01); *G08G 5/0039* (2013.01); *B64C 39/024* (2013.01); *G06V 20/194* (2022.01)

(58) Field of Classification Search
CPC .. G06K 9/6221; G06K 9/2054; G08G 5/0039; B64C 39/024
USPC .......................................................... 701/3
See application file for complete search history.

(56) References Cited

U.S. PATENT DOCUMENTS

| | | | |
|---|---|---|---|
| 6,422,508 | B1 | 7/2002 | Barnes |
| 7,302,316 | B2 | 11/2007 | Beard et al. |
| 2002/0167587 | A1 | 11/2002 | Ogasawara |
| 2012/0065924 | A1* | 3/2012 | Nielsen ................... G01C 15/02 702/135 |
| 2013/0162665 | A1* | 6/2013 | Lynch ................ G01C 21/3647 345/589 |
| 2013/0318214 | A1* | 11/2013 | Tebay .................... H04L 67/125 709/219 |
| 2015/0221093 | A1* | 8/2015 | Sagawa .............. G01B 11/2513 345/419 |
| 2016/0050840 | A1* | 2/2016 | Sauder ................. A01B 79/005 701/3 |
| 2016/0140097 | A1* | 5/2016 | Yoshikawa ............. G06F 11/32 715/780 |
| 2016/0157414 | A1 | 6/2016 | Ackerman et al. |
| 2017/0032497 | A1* | 2/2017 | Sarma ..................... G06T 11/60 |
| 2019/0384283 | A1 | 12/2019 | Chowdhary et al. |
| 2022/0197276 | A1 | 6/2022 | Chowdhary et al. |

FOREIGN PATENT DOCUMENTS

| | | |
|---|---|---|
| CN | 203528819 U | 4/2014 |
| CN | 203528826 U | 4/2014 |
| CN | 103803083 A | 5/2014 |
| WO | 2013092058 A1 | 6/2013 |
| WO | 2016123201 A1 | 8/2016 |
| WO | 2018136875 A1 | 7/2018 |

OTHER PUBLICATIONS

Communication pursuant to Rules 70(2) and 70a(2) EPC for EP Appln. No. 18741140.0, mailed Oct. 13, 2020.
Extended European Search Report for EP Appln. No. 18741140.0, mailed Sep. 25, 2020.
International Search Report and Written Opinion for PCT/US2018/014695 mailed, Mar. 29, 2018.
"'International Preliminary Report on Patentability'", PCT/US2018/014695 IPRP mailed Aug. 1, 2019.
Allamaraju, Rakshit, et al., "Human aware path planning in urban environments with nonstationary mdps.", In International Conference on Robotics and Automation, Hong Kong, China, 2014. IEEE.
Axelrod, Allan, et al., "Adaptive algorithms for autonomous dataferrying in nonstationary environments", In Aerospace Science and Technology Forum, Kissimmee, FL, 2015. AIAA., 1-13.
Axelrod, et al., "Exploitation by Informed Exploration between Isolated Operatives for Information—Theoretic Data Harvesting", In Conference on Decisions and Control, Osaka, Japan, 2015. IEEE. Submitted., Dec. 15, 2015, 6 pgs.
Axelrod, Allan, et al., "Uninformed-to-informed exploration in unstructured real-world environments", In Self-Confidence in Autonomous Systems, Washington D.C., USA, 2015. AAAI., 1-3.
Blackburn, George Allen, "Hyperspectral remote sensing of plant pigments", Journal of experimental botany, 58(4):855-867, 2007, Sep. 21, 2006, 13 pgs.
Campbell, Trevor, et al., "Planning under Uncertainty using Nonparametric Bayesian Models", In AIAA Guidance, Navigation, and Control Conference (GNC), 26 pp, Aug. 2012.
Chowdhary, Girish, et al., "Bayesian nonparametric adaptive control using gaussian processes", Neural Networks and Learning Systems, IEEE Transactions on (99):1-13, 2014.
Chowdhary, Girish, et al., "Off-Policy Reinforcement Learning with Gaussian Processes", Acta Automatic Sinica, vol. 1 No. 3, Jul. 2014.
Curran, et al., "Multispectral Remote Sensing for the Estimation of Green Leaf Area Index [and Discussion]", Philosophical Transactions of the Royal Society of London A: Mathematical, Physical and Engineering Sciences, 309 (1508):257-270, Jul. 1983., Jul. 1, 1983, 15 pgs.
Garey, Michael R., et al., "Computers and intractability: A guide to the theory of NP-completeness", W. H. Freeman and Company, San Francisco, 1979, 898-904.
Gonzalez, et al., "Unmanned aerial vehicles (uavs) and artificial intelligence revolutionizing wildlife monitoring and conservation", Sensors, 16(1):97, 2016, Jan. 14, 2016, 18 pgs.
Govender, et al., "A review of hyperspectral remote sensing and its application in vegetation and water resource studies", Water Sa, 33(2), 2007, Apr. 2, 2007, 9 pgs.
Grande, et al., "Online regression for data with changepoints using gaussian processes and reusable models", IEEE Transactions on Neural Networks and Learning Systems, pp. (99):1-14, 2016, 2016, 14 pgs.
Kaarthik, Sundar, et al., "Algorithms for routing an unmanned aerial vehicle in the presence of refueling depots.", IEEE Transactions on Automation Science and Engineering, 11(1):287-294, 2014.
Kingravi, Hassan A., et al., "Kernel Controllers: A Systems-Theoretic Approach for Data-Driven Modeling and Control of Spatiotemporally Evolving Processes", 2015 IEEE 54th Annual Conference on Decision and Control (CDC), pp. 7365-7370, Dec. 15-18, 2015. Osaka, Japan.
Kingravi, Hassan, et al., "Kernel observers: Systems theoretic modeling and inference of spatiotemporally varying processes", In Advances in Neural Information Processing Systems (NIPS), Barcelona, Spain, 2016.
Komi, et al., "Plant classification combining colour and spectral cameras for weed control purposes", International Symposium on Industrial Electronics, pp. 2039-2042. IEEE, 2007., 2007, 4 pgs.

(56) References Cited

OTHER PUBLICATIONS

Kulis, et al., "Revisiting k-means: New algorithms via bayesian nonparametrics", In Proceedings of the 29th International Conference on Machine Learning (ICML-12), pp. 513-520, 2012, 2012, 8 pgs.

Leprince, S., et al., "Automatic and Precise Orthorectification, Coregistration, and Subpixel Correlation of Satellite Images", IEEE Transactions on Geoscience and Remote Sensing, 45(6):1529-1558, Jun. 2007.

Meron, M, et al., "Aerial thermography for crop stress evaluation—a look into the state of the technology", In Precision agriculture'13, pp. 177-183. Springer, 2013, 2013, 7 pgs.

Philipp, et al., "Improving plant discrimination in image processing by use of different colour space transformations", Computers and electronics in agriculture, 35(1):1-15, 2002., 2002, 15 pgs.

Primicerio, et al., "A flexible unmanned aerial vehicle for precision agriculture", Precision Agriculture, 13(4):517-523, 2012, Jan. 19, 2012, 7 pgs.

Sugiura, et al., "Field phenotyping system for the assessment of potato late blight resistance using RGB imagery from an unmanned aerial vehicle.", Biosystems Engineering, 148:1-10, 2016, May 18, 2016, 10 pages.

Szeliski, Richard, "Image alignment and stitching: A tutorial", Foundations and Trends® in Computer Graphics and Vision, 2(1): 2006., 89pgs.

Torres-Sanchez, Jorge, et al., "Configuration and specifications of an unmanned aerial vehicle (UAV) for early site specific weed management", PLoS One, 8(3) 58210, 2013.

Trummel, K.E., et al., "Technical Note—The Complexity of the Optimal Searcher Path Problem", Institute for Operations Research and the Management Sciences (INFORMS), Operations Research 34(2):324-327, 1986.

Ure, N. Kemal, et al., "Adaptive Planning for Markov Decision Processes with Uncertain Transition Models via Incremental Feature Dependency Discovery", In European Conference on Machine Learning (ECML), 16 pp. 2012.

Ure, Nazim Kemal, "Health aware planning under uncertainty for uav missions with heterogeneous teams.", In Proceedings of the European Control Conference, Zurich, Switzerland, Jul. 2013.

Zermas, et al., "Automation solutions for the evaluation of plant health in corn fields", 2015 IEEE/RSJ International Conference on Intelligent Robots and Systems (IROS), pp. 6521-6527, Sep. 1, 2015, 7 pgs.

Zhang, "Computer Vision", (see Zhang, Computer Vision, 1999. The Proceedings of the Seventh IEEE International Conference on, 666-673. IEEE. 1999).

* cited by examiner

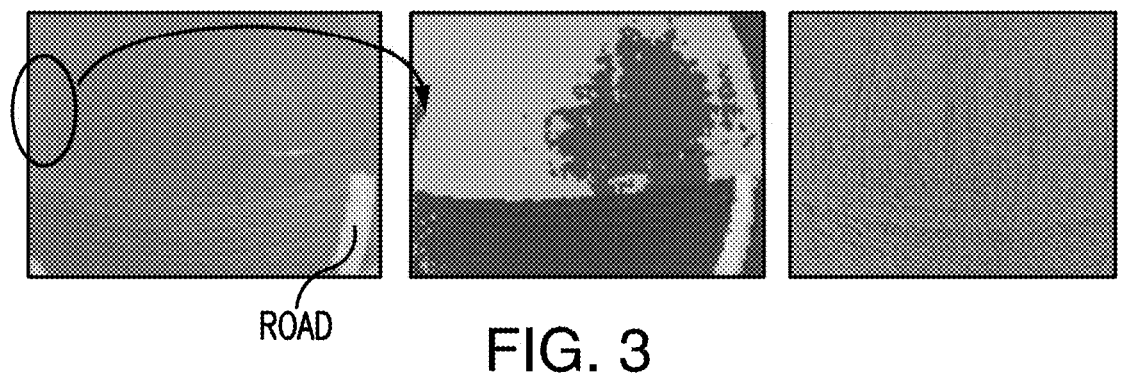
FIG. 3
FIG. 4
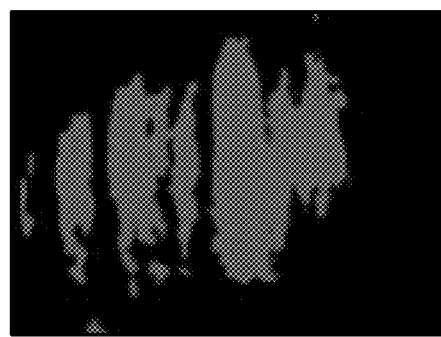 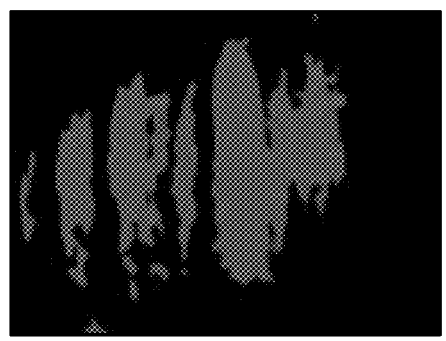
FIG. 5A   FIG. 5B

Close-up images of anomalous areas from Stage 2 Path

Field overview from Stage 1 Path

ADAPTIVE CYBER-PHYSICAL SYSTEM FOR EFFICIENT MONITORING OF UNSTRUCTURED ENVIRONMENTS

CROSS-REFERENCE TO RELATED APPLICATIONS

This application is a continuation of U.S. patent application Ser. No. 17/522,699, filed on Nov. 9, 2021 (now U.S. Pat. No. 11,703,855), which is a continuation of U.S. patent application Ser. No. 16/480,076, filed on Jul. 23, 2019 (now U.S. Pat. No. 11,199,838), which is a U.S. National Stage of International Application No. PCT/US18/14695, having an International Filing Date of Jan. 22, 2018, which claims the benefit of U.S. Provisional Application No. 62/449,439, filed on Jan. 23, 2017. All sections of the aforementioned application(s) and/or patent(s) are incorporated herein by reference in their entirety.

GOVERNMENT LICENSE RIGHTS

This invention was made with government support under 1720695 awarded by the National Science Foundation. The government has certain rights in the invention.

FIELD OF THE DISCLOSURE

The subject disclosure relates to a method and system for monitoring of unstructured environments.

BACKGROUND

Improving food security, while at the same time enhancing the environmental sustainability and economic viability of large-scale production agriculture is a momentous challenge. Intensive field monitoring is a highly effective way of boosting yields, since it allows growers to identify potential problems such as weeds, diseases, pests and nutrient deficiencies early, and correct them reliably and cost-effectively. However, the shortage of well-trained agronomists, as well as the prohibitive costs of intensively monitoring fields in person, results in most fields being monitored less frequently and less thoroughly than desirable. Therefore, there is an urgent need for innovative technical solutions that improve the actionability, ease-of-use, cost-effectiveness, and labor-efficiency of in-season monitoring of fields producing commodity crops like soybean.

Current aerial-monitoring products do not deliver readily actionable information despite requiring high cost sensors and high-bandwidth cloud-connectivity, and being challenging to use. Even after the typical turn-around times of 8-24 hours to deliver analyses such as Normalized Difference Vegetation Index (NDVI), they do not deliver specific actionable information directly. Instead, current analyses serve only to indicate potential problem areas in a field and require the agronomist to re-visit the field and visually inspect these areas to verify the problem and ascertain its cause. Therefore, there is a strong desire for technological solutions that actually improve the productivity of in-season field monitoring, and for other applications including ranching, forestry, natural environments and infrastructure monitoring.

BRIEF DESCRIPTION OF THE DRAWINGS

The features, objects and advantages other than those set forth above will become more readily apparent when consideration is given to the detailed description below. Such detailed description makes reference to the following drawings, wherein:

FIG. 3 illustrates an image analysis from an adaptive flight-planning method which enables on-site detection of anomalous areas. A high altitude RGB image from a Unmanned Aerial or Aircraft System or Vehicle (UAS) (left image), is transformed to an HSV (hue-saturation-value) colorspace on which Deviance Detection algorithm can find anomalous areas (center image). A closeup of these areas is obtained by the UAS in the second stage of the same mission (right image). The application can automate this workflow and rapidly deliver actionable information, such as without the need for a cloud connection.

FIG. 4 illustrates detection by the exemplary method of areas of high agronomic interest in RGB images of a field (left image) with clustering (center image) and exemplary deviance detection (right image) algorithms. The methodology implements these algorithms in a robust, reliable, fast, and power-efficient manner, such as on tablet computers. The algorithms can be validated on a broad variety of crop-issues, optimizing on the above criteria, and improving their robustness to irrelevant signals (such as clouds or non-agricultural objects).

FIGS. 5A-5B illustrate: 5A. (left image) shows clusters found in an image at 20% of original resolution. 5B. (right image) shows clusters found with an image at 100% resolution.

In FIG. 7A, the original raw image has significant distortion around the periphery. In FIG. 7B, the undistorted image is generated where the rows become properly straightened after correction.

Figure 1:
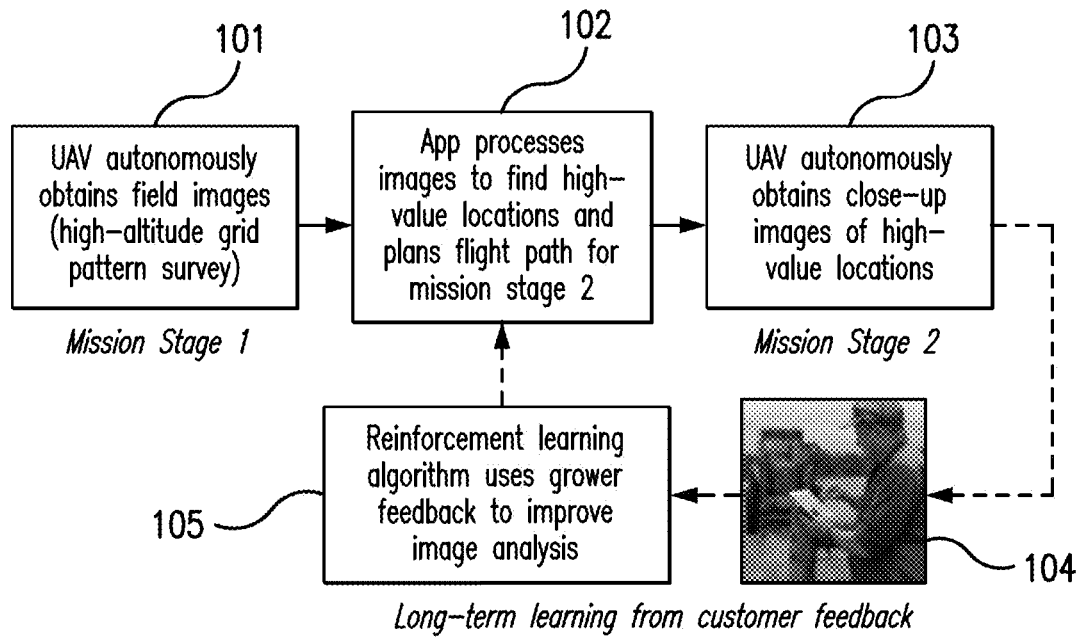
FIG. 1 illustrates workflow of a field-monitoring method that provides farmers with close-up pictures of anomalous areas of the farm, without having to wait for cloud based analysis. Feedback from users on the delivered images can be used to improve the algorithms. The workflow can be applied for monitoring of unstructured environments.

While the present invention is susceptible to various modifications and alternative forms, exemplary embodiments thereof are shown by way of example in the drawings and are herein described in detail. It should be understood, however, that the description of exemplary embodiments is not intended to limit the invention to the particular forms disclosed, but on the contrary, the intention is to cover all modifications, equivalents and alternatives falling within the spirit and scope of the invention as defined by the embodiments above and the claims below. Reference should therefore be made to the embodiments above and claims below for interpreting the scope of the invention.

DETAILED DESCRIPTION

The system and methods now will be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements.

Likewise, many modifications and other embodiments of the system and methods described herein will come to mind to one of skill in the art to which the invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

Unless defined otherwise, all technical and scientific terms used herein have the same meaning as commonly understood by one of skill in the art to which the invention pertains. Although any methods and materials similar to or equivalent to those described herein can be used in the practice or testing of the present invention, the preferred methods and materials are described herein.

Overview

Figure 2:
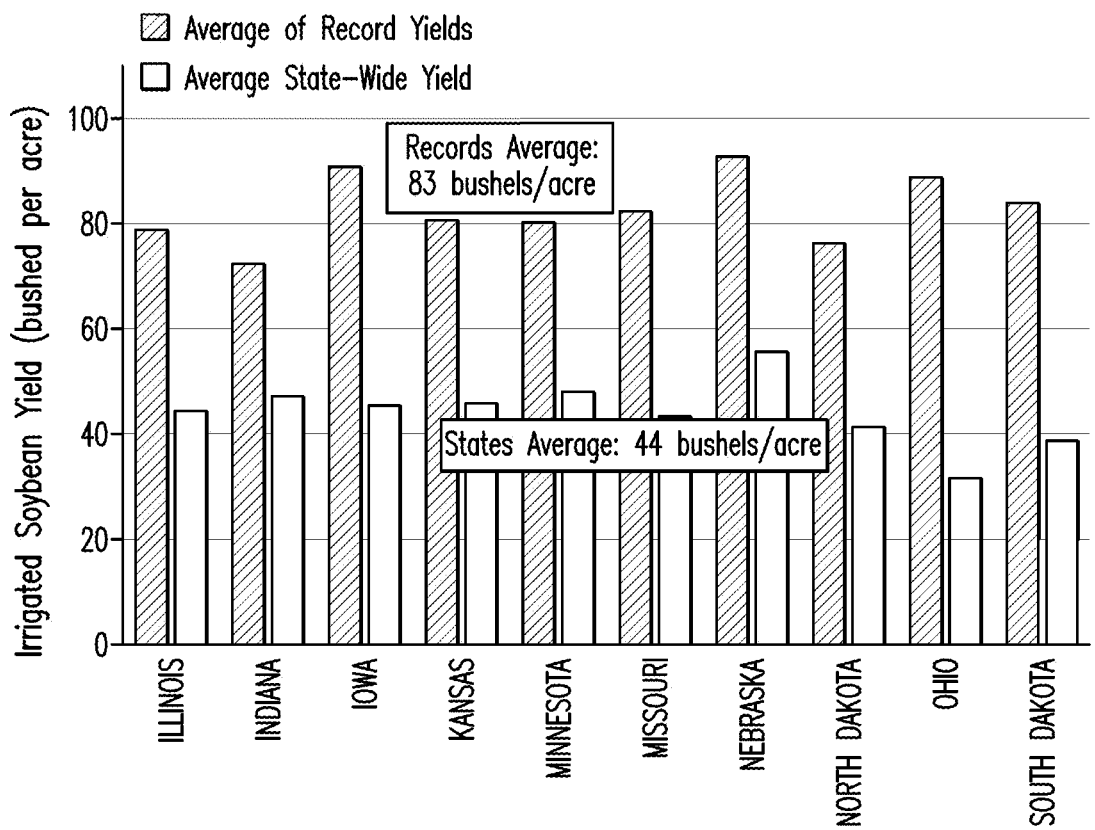
FIG. 2 illustrates a yield-gap between award winning soybean yields and the state-wide average yields of irrigated soybean in 2012 in the top ten soybean producing states. The average unrealized yield of about 40 bushels/acre amounts to around $125,000 for an average farm operation (400 acres) at current soybean prices.

The two key hurdles to realizing the potential benefits of UAS or other unmanned vehicles for monitoring of unstructured environments (e.g., in agriculture) that are addressed by the present disclosure are high capital and labor costs of using drones and the impracticality of use in rural areas. By way of summary, the present disclosure provides an adaptive cyber-physical system for efficient monitoring of unstructured environments using adaptive multi-stage flight planning algorithms for efficient and informative field monitoring to increase monitoring efficiency and reduce labor costs. In addition, computationally efficient algorithms were created for in-situ data analysis obviating the need for uploading large amounts of data to the cloud for analysis, which can be a substantial hurdle in areas with poor internet connectivity. Also, algorithms for identifying and classifying potential informative areas from the field or area of interest have been created to improve continually by learning from user feedback. These innovations, motivated by real agronomic needs, are essential for creating compelling products and a novel approach. An example of crop yields is illustrated in FIG. 2.

Disclosed herein is a system and method to automatically identify sub-areas of high potential interest to the user in images of the entire area under observation and to automatically determine and execute flight- and/or ground-paths of an Unmanned Aerial or Ground vehicle to obtain high-resolution pictures of those areas. Furthermore, the system learns from users' feedback and improves its ability to acquire and present high-value images to the users.

The cyber-physical system includes a set of algorithms and their software implementations operating on physical hardware in a real-world unstructured environment. The system can determine, such as in real-time, the most interesting locations to examine in detail by analyzing visual data from high-altitude images using resources on-board and/or on a connected computer. The system can then develop a path for the vehicle to obtain close-up images of these potential high-information locations. The interesting locations are found using a set of image processing algorithms including, but not limited to, spectral analysis, neural network analysis, and/or nonparametric clustering algorithms. Reinforcement learning algorithms that are trained using user inputs can continually improve the utility of the system. Although the present disclosure describes examples of applications in agricultural applications, it can be adapted/extended and applied to non-agriculture applications including ranching, forestry, natural environments, and infrastructure monitoring. In addition to monitoring crops for any potential problems and quality of growth, it can also be used for stand counts and weed identification, for example.

FIG. 1 shows the general flow of an example of a cyber-physical system that can monitor unstructured environments. The individual elements and associated algorithms of the cyber-physical system are now described in one embodiment.

At 101, the user can indicate the area of interest and a flight plan can be planned automatically. High-altitude images can be acquired using a grid based flight pattern. In one embodiment, this process can take into account the field-of-view and/or lens-distortion of the camera and the aircraft altitude to take the least number of geotagged images that completely cover the entire area of interest.

At 102, image processing can be performed. As an example, geolocations associated with each of an arbitrary number of sub-areas of each high-altitude image can be identified. Images can also be processed to correct for lens-distortion (which may not be required by the algorithms described in the following), and/or color correction. Image analysis can be performed. For example, one or more automatic segmentation algorithms, including but not limited to a newly developed grid-comparison algorithm and a Dirichlet process K-means algorithm, can be employed to identify different features associated with different parts of images. Transformations may be applied to the images to enable specific feature detection algorithms and improve computational efficiency, including, but not limited to RGB-to-HSV transformation. The features analyzed for detecting high-information areas can include spectral information, spatial gradients in spectral characteristics, object or shape recognition, and image structure. Planning flight-path can be performed to obtain close-up images. As an example, the interesting images, such as tagged by users, are associated with geographical locations. An algorithm for optimally planning a route that visits all of those locations is autonomously planned.

At 103 and 104, the UAV and/or ground vehicle executes that path using GPS, INS, or other sensing aids to obtain the target close-up images of potentially high value locations, and user feedback can be obtained. Users can be shown images that they are most likely to find important, potentially along with images with undetermined predicted utility. User feedback or rating of images, such as thumbs up or thumbs-down rating, or other scales of rating, can be obtained. Users can also provide a label in the form of a voice note, a written label, or by preselecting from an existing set of labels.

At 105, the system can be adapted to find the most interesting images. For example, a learning element including but not limited to Neural Network, Gaussian Process, Support Vector Machine, or nonparametric clustering algorithm, can be used to automatically identify which image-feature clusters users are most likely to find interesting.

One or more benefits of the present disclosure are, for example, autonomous UAS mission planning will enable agronomists, ranchers, park rangers, etc. to use UAS with minimal technical expertise. Immediate delivery of specific actionable information will improve the speed and effectiveness of response to the particular issues. The UAS based system will enable complete monitoring of each field or area, rather than the random-sampling approach taken during 'on-foot' scouting. Field-scouting time will be reduced, such as from about an hour per field for on-foot scouting to about 15 minutes. The use of consumer UASs and visual-spectrum cameras will substantially reduce the cost of aerial monitoring Tablet or cell phone application.

In one embodiment, a tablet application (app) (or application executed by another mobile device) can present to the agronomist a number of (e.g., about 10) close-up photographs of potential problem areas in a field obtained during a short (e.g., about 15 minutes) and fully autonomous mission of a consumer drone (e.g., equipped only with a visual spectrum camera). The agronomists can use their domain knowledge and experience to interpret these images and decide on the best course of action. Although a mobile device is described, the application can be executed on other computing devices including a desktop computer.

In contrast with existing approaches, this approach can make it possible to reduce the total field-monitoring time for a typical 80 acre field to under 15 minutes from UAS launch to presentation of high-value images. In comparison, a typical human agronomist team can scout a field in 1 to 2 hours. While existing drone-based approaches require about half an hour to capture images, the requirement of uploading the data to cloud for analysis adds several hours to days for the total workflow, delaying revelation of potential issues.

Conventional, or "on-foot", crop scouting is often carried out by trained teams with members that are experts in various aspects of agronomic issues such as weeds, fungal diseases, insect pests, etc. Due to the need for monitoring a large number of fields during critical times in the growing season agronomists have to rely on sampling small areas of the fields, rather than thoroughly surveying each field. While this approach is successful in routine inspections and spotting most problems, it can miss areas of concern. Moreover, when the soybean canopy begins to close, on-foot inspection is not feasible, though major problems can still arise.

With respect to aerial field-monitoring, farmers and agronomists have consistently asserted throughout customer-discovery interactions that a useful crop monitoring product does not yet exist, despite numerous commercial offerings. It is believed that the recent rapid drop in the cost of UASs has led to a massive increase in the commercial activity, jumping ahead of the actual capabilities of the technology that are necessary for critical product features. Commercial offerings have also implemented post-processing like stitching [1] and orthorectification [2, 3] that are traditional satellite based remote sensing, but have little agronomic relevance. Conversely, the vast majority of academic research on aerial monitoring has focused on using data from developmental sensors (hyper- or multi-spectral cameras) that are not yet ready for reliable use.

However, agronomists who have inspected fields with simple cameras on drones have found that they can reliably spot problem areas from the visual images and examine them by manually controlling flights. Of course, this approach is quite labor intensive and therefore not cost effective. Automating and improving drone-based visual scouting is therefore a compelling approach to improving the effectiveness and productivity of agronomists.

With respect to academic research on aerial field-monitoring: There has been a reliance on expensive sensors in academic research on aerial monitoring and remote sensing of agriculture. The bulk of the research has been based on data from multi-spectral [3, 4] and hyperspectral [5, 6, 7] imagery. Laser Interferometric Detection and Ranging (LIDAR) [8, 9], fluorescence spectroscopy [6, 10], and thermography [11, 12] have also been investigated as potential agriculturally useful sensors. This reliance on advanced sensors may be an artifact of the historical work in satellite based remote sensing, which involved techniques like Normalized Difference Vegetation Index (NDVI) for continental-scale environmental health assessments [13, 14]. However, the major hurdles to the use of such sensors is their cost, complexity, and weight. Costly sensors (often over $10,000), that require a high degree of technical expertise to operate and interpret the data from are impractical for use in conventional commodity crop agriculture.

UAS borne visual-spectrum sensors have also been used successfully to collect useful data from agriculture, including for predicting yields [15], phenotyping [16], evaluating the health of the plants [17], and identifying weeds [18]. These results, as well as the experience of agronomists in successfully spotting problem areas in the field visually from drone survey forms the foundation for our proposed approach.

With respect to commercial offerings for agricultural monitoring: While there is currently increasing amount of commercial activity in agricultural drones, a cohesive and useful solution has not emerged. A brief description of major participants in UAS based agricultural monitoring follows: Drone hardware companies (e.g. DJI, 3DR) make consumer-friendly drones, but it is believed that the do not provide mission automation, sensing, or actionable insights. Flight management services, (e.g. DroneDeploy) offers mission planning software that generates basic flight plans, but it is believed that these flight plans cannot deliver actionable information to the farmers. Sensor companies (e.g. Sentera, MicaSense) are offering multi-spectral sensing which it is believed that most farmers find neither usable nor actionable. Satellite data (e.g. Planet Labs) is too low-resolution for farmers to reliably gauge even in-season trends, let alone deliver specifically actionable information. Finally, companies that integrate several elements (e.g. PrecisionHawk) or that provide cloud-based data analysis (e.g. AgLytix) need large data sets to be uploaded to their servers, which is highly impractical in agricultural locations, the majority of which have very low bandwidth connections to the Internet, if they are not completely off-grid. The efforts on data analysis part of this value chain have perhaps been the most misdirected. Techniques like stitching (also known as mosaicking) [1] and orthorectification [2], and NDVI [13], in particular are pursued as a standard part of the agricultural monitoring toolkit due to their historical tradition of use in satellite-based remote sensing, even though their effectiveness in improving agronomic outcomes is at best questionable.

Adaptive Anomaly Detection of Agricultural Fields

This section describes algorithms that can be used in an adaptive anomaly detection system of the present disclosure for agricultural fields. The system aims at efficiently detecting anomalous regions on a large crop farm using off-the-shelf cameras carried by unmanned aerial vehicles (UAV).

The UAV first performs a uniform grid scan over the farm field at a high altitude. The images collected at constant intervals are then processed to determine key regions of interest (ROI) that are potentially anomalous. Next, the path planning algorithm uses the positions of ROI to generate the route for low-altitude flight.

Distortion Removal

In order to maximize the area covered in each image, the camera on the drone can be equipped with wide angle lenses which create significant distortion around the periphery. Thus, the first step is to remove the artifact caused by lens distortion. The camera is calibrated before each flight, such as using an open source calibration routine based on the work by Zhang (see Zhang, Computer Vision, 1999. The Proceedings of the Seventh IEEE International Conference on, 666-673. IEEE. 1999), although pother calibration techniques can be utilized. The calibration algorithm finds the optimal camera parameters and distortion coefficients that minimize the reprojection error between observed image points and their known 3D world coordinates. In the calibration procedure, a chessboard pattern is recorded in at least 20 orientations. The corners are detected and used to determine the optimal camera parameters based on all 20 images. The reprojection residual from the optimal camera parameters is on the order of 0.1 pixel.

Figure 7A:
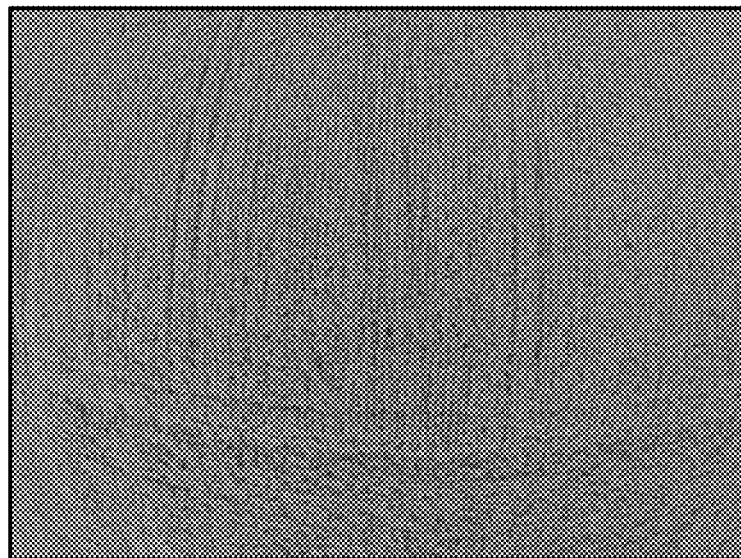
FIGS. 7A and 7B illustrate distortion removal performed by the exemplary method.
Figure 7B:
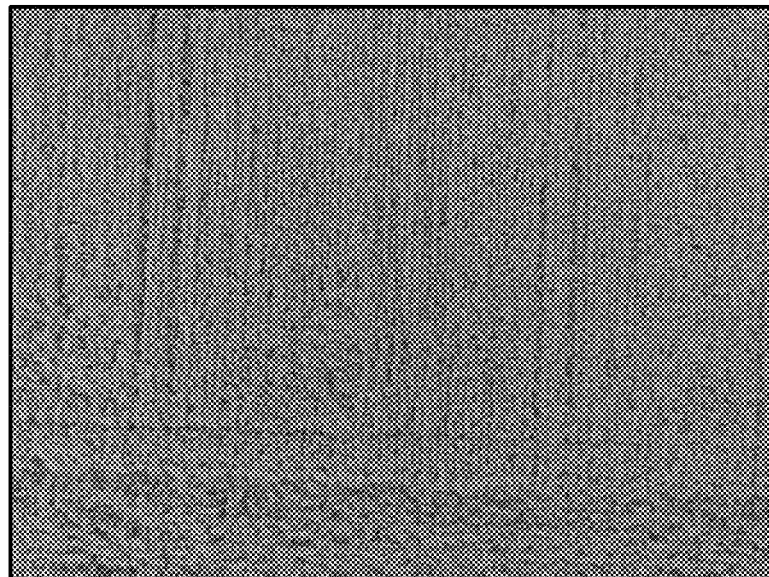

Once the camera parameters and distortion coefficients are determined, each pixel (u,v) in the corrected image is mapped to the corresponding coordinate in the original image by a non-liner function of the parameters to remove the distortion. FIGS. 7A and 7B illustrate distortion removal performed by the exemplary method. In FIG. 7A, the original raw image has significant distortion around the periphery. In FIG. 7B, the undistorted image is generated where the rows become properly straightened after correction.

Classical clustering algorithms, such as k-means, requires appropriate choice of the number of clusters which is often unknown a priori. The DP-means algorithm utilized in one or more embodiments, eliminates such requirement by including a penalty for the number of clusters.

Clustering

The anomaly detection algorithm is based on the assumption that farm fields are generally homogeneous with few scattered deviations. A clustering algorithm can effectively separate these anomalies from the majority of the image. A Bayesian non-parametric clustering algorithm named DP-means is applied. First an image is converted to HSV (hue, saturation, and value) color space. We then apply a Gaussian blur to smooth out small scale spatial variations. Finally, the pixels are clustered according to their HSV values. The algorithm iteratively reduces the objective function until local convergence:

$$\sum_{c=1}^{k} \sum_{x_i \in \ell_c} \|x_i - \mu_c\|^2 + \lambda k$$

| Algorithm 1: DP-means | |
|---|---|
| Input: | $x_1, \ldots, x_n \rightarrow$ data |
| Parameter: | $\lambda \rightarrow$ cluster penalty |
| Output: | $\ell_1, \ldots, \ell_k \rightarrow$ clusters |

-continued

Algorithm 1: DP-means

Initialize:
$\mu_1, \ldots, \mu_k \rightarrow$ cluster centroids
$z_1, \ldots, z_k \rightarrow$ cluster labels
$k = 1$
$\ell_1 = \{x_1, \ldots, x_n\}$ $$\mu_1 = \frac{1}{n}\sum_{i=1}^{n} x_i$$

Figure 8A:
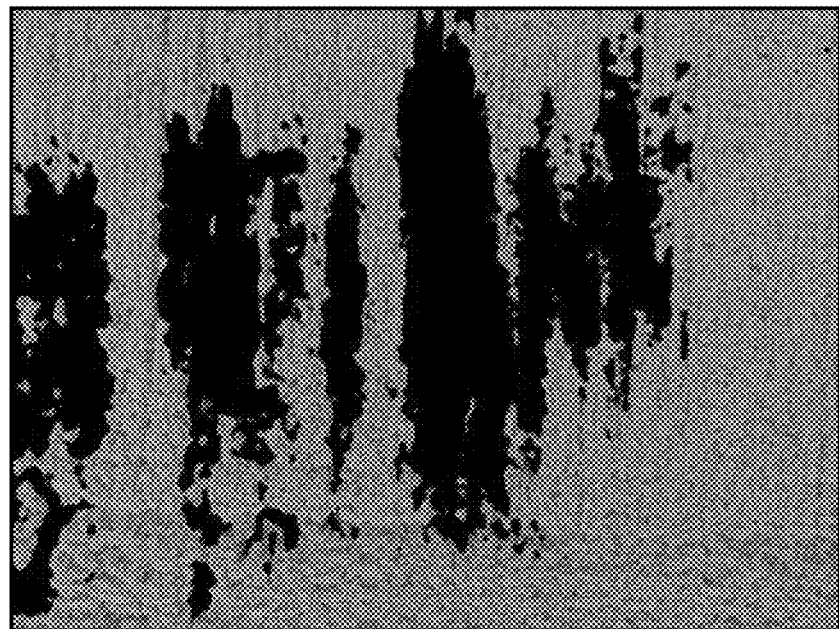
FIGS. 8A-8B illustrate clustered images. A DP-means algorithm is applied to find two clusters within the image, where A) cluster 1 corresponds to the background and B) cluster 2 is an anomaly.
Figure 8B:
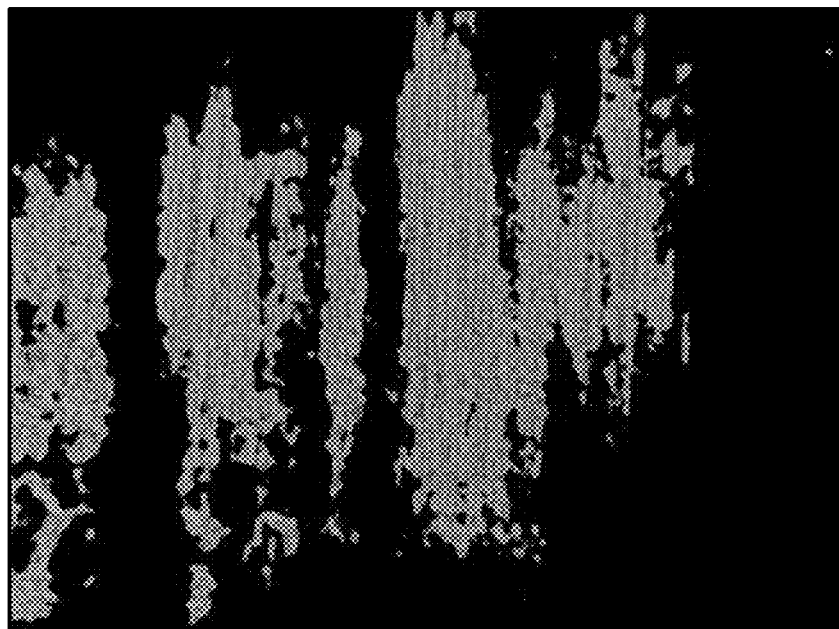

$z_i = 1 \forall i = 1, \ldots, n$
while not converged do
  foreach $x_i$ do
    Compute $d_{ic} = \|x_i - \mu_c\|^2$ for $c = 1, \ldots, k$ if $\min_c d_{ic} > \lambda$ then $k = k + 1$
      $z_i = k$
      $\mu_k = x_i$
    end
    else
      $z_i = \text{ar gmin}_c d_{ic}$
    end
  end
  Update clusters: $\ell_j = \{x_i | z_i = j\}$
  foreach $\ell_j$ do Update centroids: $\mu_j = \frac{1}{|\ell_j|}\sum_{x_i \in \ell_j} x_i$ end
end The result of the DP-means are shown in FIGS. 8A-8B.

ROI Identification

Figure 9:
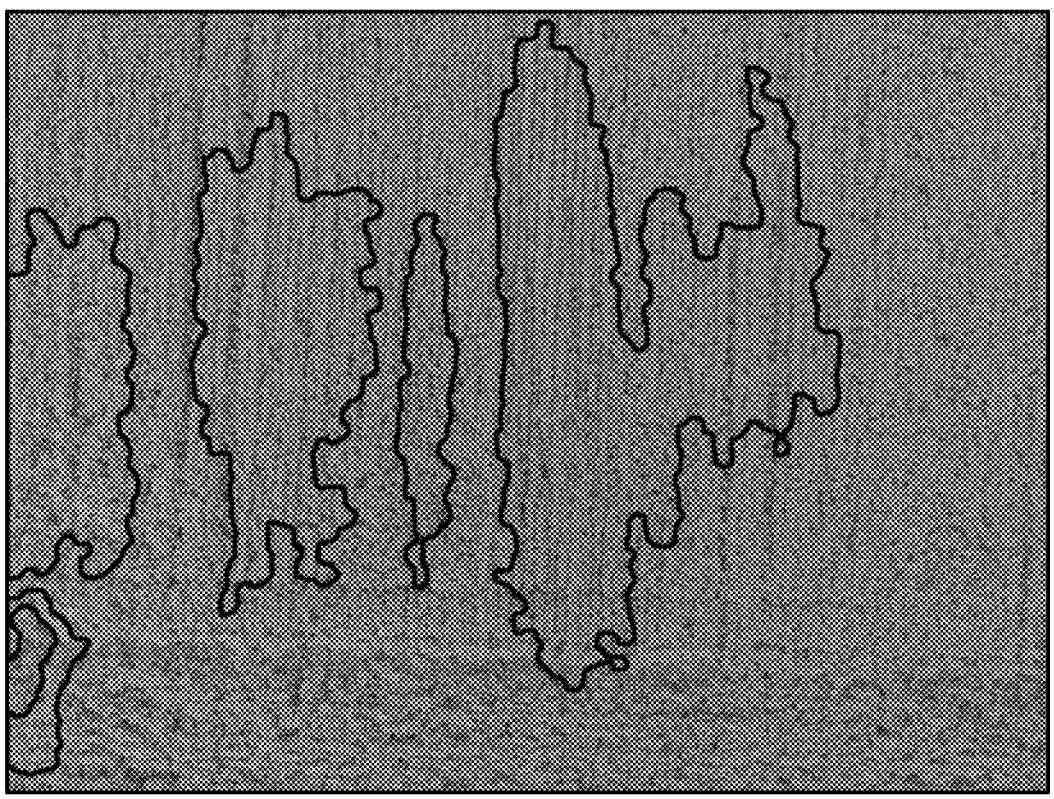
FIG. 9 illustrates the exemplary methodology being applied and resulting in the identified top five Regions of Interest (ROIs) from the anomalous blobs.

Adjacent pixels belonging to the same cluster are agglomerated into blobs of various sizes. Each blob is a potential ROI. The can be ranked by a function of size and deviation from the global mean to identify the most significant feature. Top N ROIs are output to the path planning algorithm for the subsequent low-altitude flight. FIG. 9 shows the top 5 ROIs from the clustered image.

Path Algorithm

This section describes the functions and path-planning algorithm utilized in an adaptive anomaly detection system of agricultural fields. The path-planning algorithm uses the positions of the key regions of interest (ROI) to generate a route for low-altitude flight.

Pre-Processing Data

Converting Pixel Coordinates to Geodesic Coordinates

To determine the path between ROIs in different images, the pixel coordinates of ROIs can be converted into geodesic coordinates. This is done by using the altitude logged in the high-altitude flight, the pixel size of the image, the geodesic coordinates of the center of the image, and the field of view (FOV) of the camera in the following equations:

$$\text{Horizontal Pixel Distance} = 2 * \text{Altitude}\frac{\tan\left(\frac{horizontalFOV}{2}\right)}{ImageWidth} \quad (1)$$

$$\text{Vertical Pixel Distance} = 2 * \text{Altitude}\frac{\tan\left(\frac{verticalFOV}{2}\right)}{ImageHeight} \quad (2)$$

$$Lat_2 = \arcsin(\sin(Lat_1)\cos(A_D) + \cos(Lat_1)\sin(A_D)\cos(\theta)) \quad (3)$$

$$Lon_2 = \quad (4)$$
$$Lon_1 + \arctan2(\sin(\theta)\sin(A_D)\cos(Lat1), \cos(A_D) - \sin(Lat_1)\sin(Lat_2))$$

Equations 1 and 2 calculate the horizontal and vertical (or width and height respectively) of individual pixels. Equations 3 and 4 determine the geodesic coordinates (Latitude, Longitude) of individual pixels based off of the latitude and longitude of the center of the image.

Altitude is the altitude in meters that the high-altitude flight image was obtained at. FOV stands for 'Field of View' of the camera or the angular field of view of the sensor. $Lat_2$, $Lon_2$ are the latitude and longitude of the individual pixel. $Lat_1$, $Lon_1$ are the latitude and longitude of the center of the image. $A_D$ is the angular distance between two geodesic points which is calculated by dividing the radial distance between the two points (distance you could measure on a map) by the radius of the earth. $\theta$ is the bearing between the two points determined by using arctan 2(X,Y) where X is the horizontal distance between two points in an image and Y is the vertical distance between two points in an image.

Ranking ROIs

Currently, ROIs are ranked by their area to determine the number of top N ROIs. Other features of images such as location, differentiation of individual anomaly types, etc. can be used to rank ROIs, alone or in combination with other features.

Developing the Path Planning in the Adaptive Path-Planning Algorithm

The geodesic coordinates and altitude (needed to obtain an image of the entire ROI) are inputs for the Path-Planning Algorithm. The algorithm consists of two parts: a nearest-neighbor search to initialize a sub-optimal path and a genetic solver for the Traveling Salesman Problem (TSP). Initially, only the genetic solver for the TSP was utilized to create a path for the low-flight. Later, the Nearest Neighbor Search Algorithm was considered and then initialized as a pre-processing step for the Genetic Path Planning Algorithm.

Nearest Neighbor Search Algorithm

The Nearest Neighbor Search Algorithm is a greedy algorithm that finds local optimum solutions which does not always yield a global optimum solution.

The geodesic coordinates and inspection altitude are inputs for this algorithm which outputs the waypoints for the Inspection Flight.

$X_0$ is initialized automatically as the "Start" node from where the UAV ends the high-altitude Scout Flight.

$X_{N+1}$ is the "Home" node that is previously obtained from the launch point of the Scout Flight.

dmat is the Distance Matrix for all nodes X and is initialized with distance calculations between the geodesic coordinates of each node to all other nodes including the "Start" and "Home" node. It is a [Nx2, Nx2] matrix that includes the value of the edges between "Start" and "Home" node.

R is the path solution to visit the N ROI nodes in the low-altitude Inspection Flight.

The distance matrix dmat is initialized along with the set of nodes to visit M excluding the Start node and Home node. To optimize the Nearest Neighbor Search solution, the search is performed both "Forwards" and "Backwards". By this, "Forwards" is from Start to Home node and "Backwards" is the reverse of these endpoints. This is performed because the "Forward" search doesn't account for the distance from the nodes in M to the Home node. Thus, in certain scenarios the "Forward" route may not always yield a shorter solution than the "Backwards" route.

The "first" iteration is done outside the while loop by finding the shortest distance between the initial node and the first closest node n in M. This node n is then removed from set M and added to final path R before being designated as previous node p.

In the "while" loop, the same process in the "first" iteration is carried out until the set of nodes to visit M is empty. Then the "end" node (which could be either the Start node or the Home node), is added to the route and the distance between the last node in M and the "end" node added is tabulated. Finally, the shorter route of the "Forward" (S) and "Backwards" (R) route is sent as output for the final path solution for the Inspection Flight.

Genetic Algorithm to Solve Fixed Endpoints-Traveling Salesman Problem (TSP)

Figure 10:
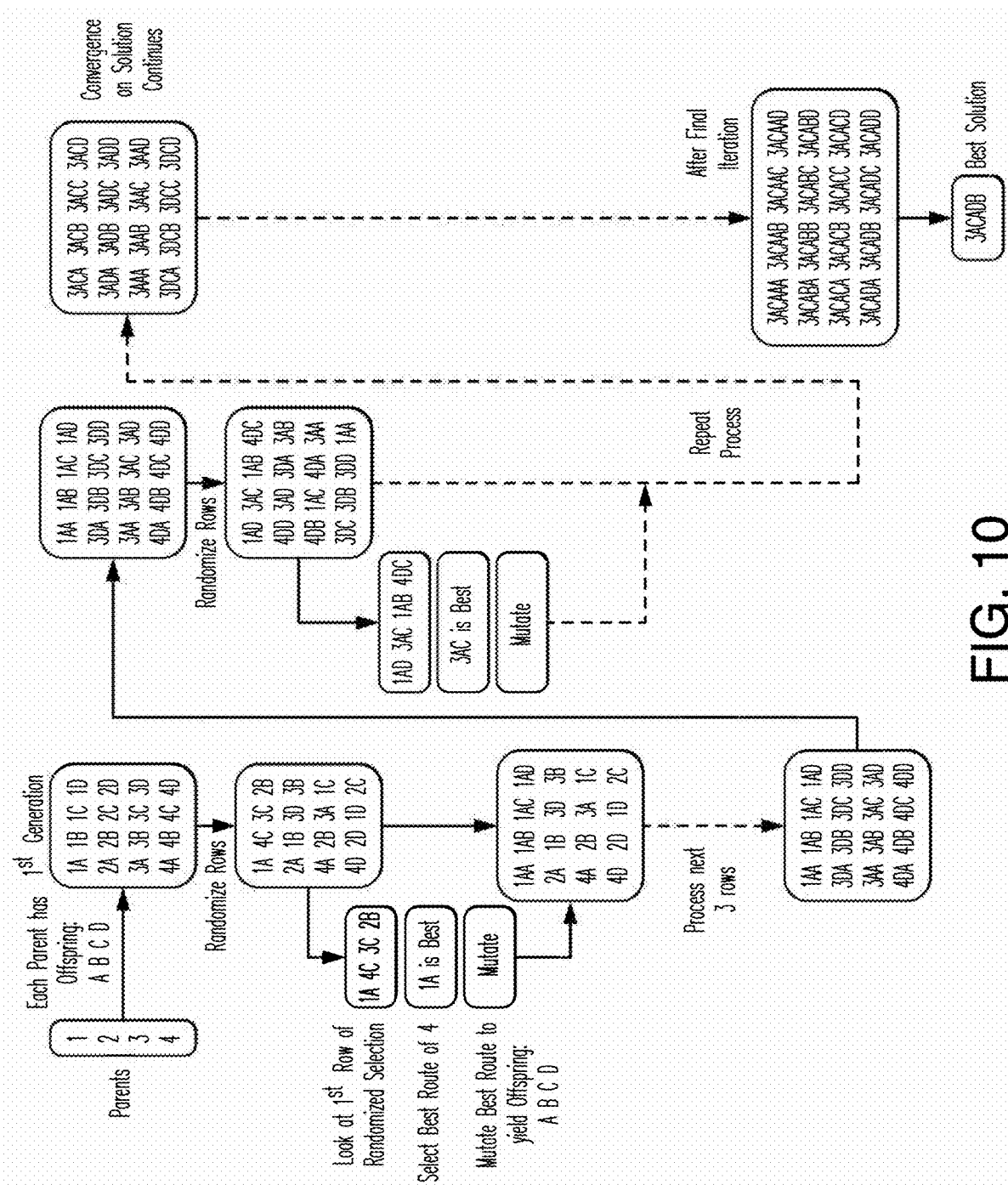
FIG. 10 illustrates a Visualization of Genetic Solver Process that can be used as part of the exemplary method.

The genetic solver for TSP determines the shortest path by process of mutation and elimination of randomized "Genes." The "Genes" in this situation are the different variations of possible paths through N regions of interest (ROIs). Demonstrated in FIG. 10, there are "Parents" who each have offspring A, B, C, and D. Each offspring has at least one unique difference. The order of these offspring are randomized before testing. 4 offspring are selected at a time for strength testing. These offspring or TestGenes (different variations of the path) are tested for minimum distance. The strongest offspring (or the TestGene that yields the shortest path) is kept while the other 3 are discarded. The "Genes" of this strongest offspring are mutated to yield another 4 offspring in the "new" generation.

The "Genes" of the "old" generation are "mutated" via randomly selecting two nodes, excluding the first and last node, in the path and executing one of the three "mutations":

Null: No mutation is made.

Flip: Reversing the order of the nodes between the two 'mutation' nodes, including the two 'mutation' nodes.

Swap: Exchange the position of the two selected nodes.

---

Algorithm 1: Nearest Neighbor Search Algorithm

```
Input      : X₁, ..., X_N → geodesic coordinates (Lat, Lon) of the centers of N ROI Nodes
             A₁, ..., A_N → Inspection altitude of top N ROIs.
Output     : Inspection Flight Path Waypoints (Coordinates & Altitude)
Initialize : X₀ = Start Node Coordinates (from where UAV ends Scout Flight) X_{N+1} = Home
             Node Coordinates (UAV ends Inspection Flight here)
             dmat = MakeDistMat(X₀, ..., X_{N+1}) → Make distance matrix between nodes
             Set dmat(r, c) = ∞, for all (r,c) where dmat(r, c) = 0
             Set dmat(1, N+2) = ∞ and dmat(N+2,1) = ∞ → Edges between X₀ and X_{N+1}
for f = 1:2 do
    if f == 1
    then
        |    first=N
        else
        |    | first
    =|N+2
        |    end
    end
    M = {2,..., N + 1} → Nodes to visit
    (distmin,n) = dmat(n,first) → Next node n to visit
    M(n) = [ ] → Removes Node n from Search
    R = [first,M(n)] → Add node in order to Forward
    Route
    p = n → Next Node n is now Previous Node p
    while M is not empty do
        |    (distmin,n) = dmat(n,p) → Next node n to visit
        |    M(n) = [ ] → Removes Node from Search
        |    R = [R,M(n)] → Add node in order to
        |    Route p = n
    end
    R = [R,first] → Add last node in
    Route
    if f==1 then
        |    S=R
        else
        |    |    R=Reverse(R) → Reverse route so it begins at Start node and ends at Home node
        |    end
        |
    end
end
if Reverse Route (R) is shortest route
```

$$\text{then } InspectionFlight = \begin{bmatrix} X_{R_1} & A_{R_1} \\ \vdots & \vdots \\ X_R & A_R \end{bmatrix} \quad \text{else Inspection Flight} = \begin{bmatrix} X_{s_1} & A_{s_1} \\ \vdots & \vdots \\ X_s & A_s \end{bmatrix}$$

Slide: Move the first 'mutation' node ('first' as in the first selected node relative to the 'second' node in the sequential order) to the end of the order of nodes between the two 'mutation' nodes while moving the other nodes as well. This means that nodes in the selected range of nodes (nodes between the two 'mutation' nodes) move to a lower or 'earlier' position in the order OriginalPosition−1. As a result, in the selected range of nodes: the first node becomes the last node; the second node becomes the first node; the third node becomes the second node, and all the way up to the last node now becoming the second to last node.

Observe the example below:
OriginalTestPath=[1,2,3,4,5,6,7,8,9,10]
Mutation Node 1=OriginalTestPath(2)
Mutation Node 2=OriginalTestPath(6)
MutatedTestPath=Slide(OriginalTestPath)
MutatedTestPath=[1,3,4,5,6,2,7,8,9,10]

One "Gene" is left unchanged; thus, three of the offspring will be mutated variations of the parent and one offspring will be an exact copy of the parent. The other offspring in the current generation undergo the same process via selecting 4 offspring at a time until the entire current generation is processed. The new generation then becomes the current generation and is then randomized for selection before undergoing the above process again. This process is repeated for I iterations. The best solution obtained at the end of these I iterations is used as the final path solution.

First Comparison Analysis

A comparison analysis between the computation times, distance, and travel times of the nearest neighbor search and the genetic solver was performed with 1000 reps for 10, 20, and 50 points randomly generated along a uniform distribution.

Genetic Solver Parameter Analysis

To improve the genetic solver, the solver's gene population size parameter and number of points input parameter were evaluated. 10, 20, and 50 uniformly distributed points were used with population sizes of 100, 200, and 500 to gauge the effect both had together on the amount of iterations needed for convergence, computation time, and travel time. 40 reps were performed for each of the sixteen levels of the test. The default number of iterations used for all reps was 5000 iterations.

Based off the results of the genetic solver's parameter test, a pre-processing step was added to the genetic solver by using the nearest-neighbor algorithm to generate an initial sub-optimal path to input. This was predicted to minimize the amount of iterations needed overall in the algorithm and reduce computation time. Another addition to the input pre-processing was minimizing the amount of iterations needed depending on the number of points inputted. For

```
Algorithm 2: Genetic Solver for the Traveling Salesman Problem

Input       : X_1,...,X_N → coordinates (Lat, Lon) of the centers of the Top N ROI Nodes
              A_1,...,A_N → Inspection altitude of Top N ROIs.
Output      : Inspection Flight Path Waypoints (Coordinates & Altitude)
Initialize  : X_0 = Start Node Coordinates (from where UAV ends high-altitude flight)
              X_{N+1} = Home Node Coordinates (UAV ends low-altitude flight here)
              dmat=MakeDistMat(X_0,...,X_{N+1}) → Make distance matrix between nodes
              Set dmat(r, c) = ∞, for all (r,c) where dmat(r, c) = 0
              Set dmat(1,N+2) = ∞ and dmat(N+2, 1) = ∞→ Edges between X_0 and X_{N+1}
              TestPaths = [4 × N Array of Zeros]
              TestGenes = [4 × N Array of Zeros]
              G_1 = [100 × N Array of Zeros] → Previous Generation
              G_2 = [100 × N Array of Zeros] → Next Generation
              distTestPaths = [0,0,0,0] → Placeholder for distance of TestPaths
              CurrentBest = X_1,...,X_N → Initialize route solution
for i = 1 : I do
|     G_1=randPerm(CurrentBest) → Genes Assembled with Random Permutations of Path
|     randSelection = randPerm(100) → Randomize order of selection of Genes
|     for j = 4 : 4 : 100 do
|     |     TestGenes = G_1(randSelection((j − 3) : j)) → Select 4 genes at a time
|     |     for d = 1 : 4 do
|     |     |     distTestPaths(d)=dmat(1, TestGenes(d, 1))
|     |     |     for n = (2 : (N)) do
|     |     |     |     distTestPaths(d)=distTestPaths(d)+dmat(TestGenes(d,n−1),TestGenes(d,n)) end
|     |     |     distTestPaths(d)=dmat(TestGenes(d,n)), N+1)
|     |     end
|     |     (distmin, ID)=min(distTestPaths) → Find shortest route
|     |     MutationNodes=randint(2, [2:N]) → Randomly select two integers between 2 and N
|     |     CurrentBest=TestGenes(ID, :)
|     |     TestPaths(1, :)=CurrentBest
|     |     TestPaths(2, :)=Flip(CurrentBest, MutationNodes)
|     |     TestPaths(3, :)=Swap(CurrentBest, MutationNodes)
|     |     TestPaths(4, :)=Slide(CurrentBest, MutationNodes)
|     |     G_2((j−3):j,
|     :) =TestPaths
|     end
|     G_1((j−3):j, :) = G_2((j−3):j, :) → Replace "Genes" in G_1 with offspring's "Genes" from G_2
| end
| R = [X_0,CurrentBest, X_{N+1}]
```

$$InspectionFlight = \begin{bmatrix} X_{R_2} & A_{R_2} \\ \vdots & \vdots \\ X_R & A_R \end{bmatrix}$$

example, if there are 10 points we may only need 500 iterations, but if there are +50 points we may need 5000 iterations.

Second Comparison Analysis

A second comparison test between the computation times and travel times of the nearest-neighbor search and the altered genetic solver was performed. It involved executing 3000 reps for sets of 10, 20, and 50 points randomly generated across Uniform and Gaussian distributions. For example, the addition of testing points generated along a Gaussian distribution can be indicative of whether the distribution of the points had an affect on the performances of the algorithms.

EXAMPLES

Example 1. Feasibility

The preliminary results demonstrate feasibility. Each algorithm has been evaluated with large real-world datasets obtained using representative hardware (3DR Solo UAS and GoPro Hero4 camera) on Soybean farms around Illinois. The algorithms described herein were thoroughly evaluated and their performance benchmarked. For example, FIG. 3 depicts implementation of a Deviance Detection Algorithm (DDA) which masks all non-anomalous areas of an image. The two interesting areas detected in the image (a small one near the left edge and one right of center) were identified by DDA in just under a second on a Macbook pro computer. Furthermore DDA can easily distinguish agricultural and non-agricultural features, such as the road towards bottom right of the image.

Example 2. In-Situ Image Analysis

Reducing computational complexity for in-situ image analysis can be achieved primarily by utilizing easy to compute pixel specific features, such as, the pixel Hue-Saturation-Value (HSV) parameters averaged over blocks of the image. This simple approach avoids the computational burden inherent in more advanced machine vision algorithms such as object recognition, feature extraction, edge detection. Using large real-world Soybean farm datasets, the exemplary process shows that anomalous areas can be quickly and reliably identified in a computationally efficient manner by simply identifying clusters of pixels that have different HSV values than the average (FIGS. 3, 4). Unlike generic object recognition or feature extraction machine vision algorithms often used in agricultural monitoring [23, 24], the exemplary embodiments utilize largely homogeneous spectral structure of modern row-crop agriculture. Leveraging this structure, the exemplary embodiments focus on identifying minute variations in HSV variables of groups of pixels that are difficult to spot with the naked eye, as described herein. Identifying variations in visual spectrum can be the most practical method for autonomous aerial agricultural monitoring until multispectral and hyperspectral cameras become substantially cheaper and lighter [25, 26, 27].

Figure 5C:
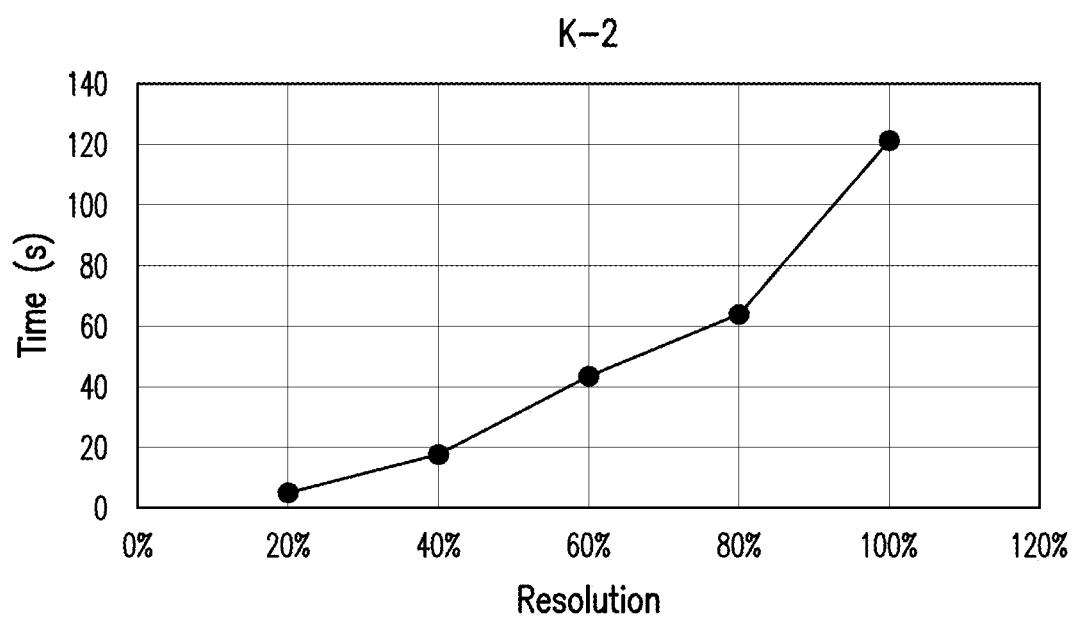
FIG. 5C illustrates computational speed vs image resolution for the exemplary method.

Reducing effective image resolution pre-analysis can be another approach for improving computational feasibility of nonparametric clustering algorithms that can improve speed without reducing detection accuracy. The exemplary embodiment of the Deviance Detection Algorithm already utilizes gridding, analyzing the image in a 100×100 matrix, which takes only 0.78 seconds even for a non-parallelized software implementation on a laptop computer (FIGS. 3 and 4). The speed of DP-means clustering (FIG. 4 (middle image) improves non-linearly with decreasing resolution without any appreciable change in cluster detection $20% and $100% (FIGS. 5A-C). These results indicate that significant computational efficiency can be achieved by using low resolution images.

Example 3. Adaptive Two-Stage Flight Planning Algorithms for Autonomous Monitoring The path planning algorithms of the exemplary embodiments can adapt the way-points in the second stage of the mission to prioritize obtaining high-resolution images of the most interesting parts of the farm using the images from the first stage of the mission, while staying conservatively within the remaining flight endurance.

Figure 6:
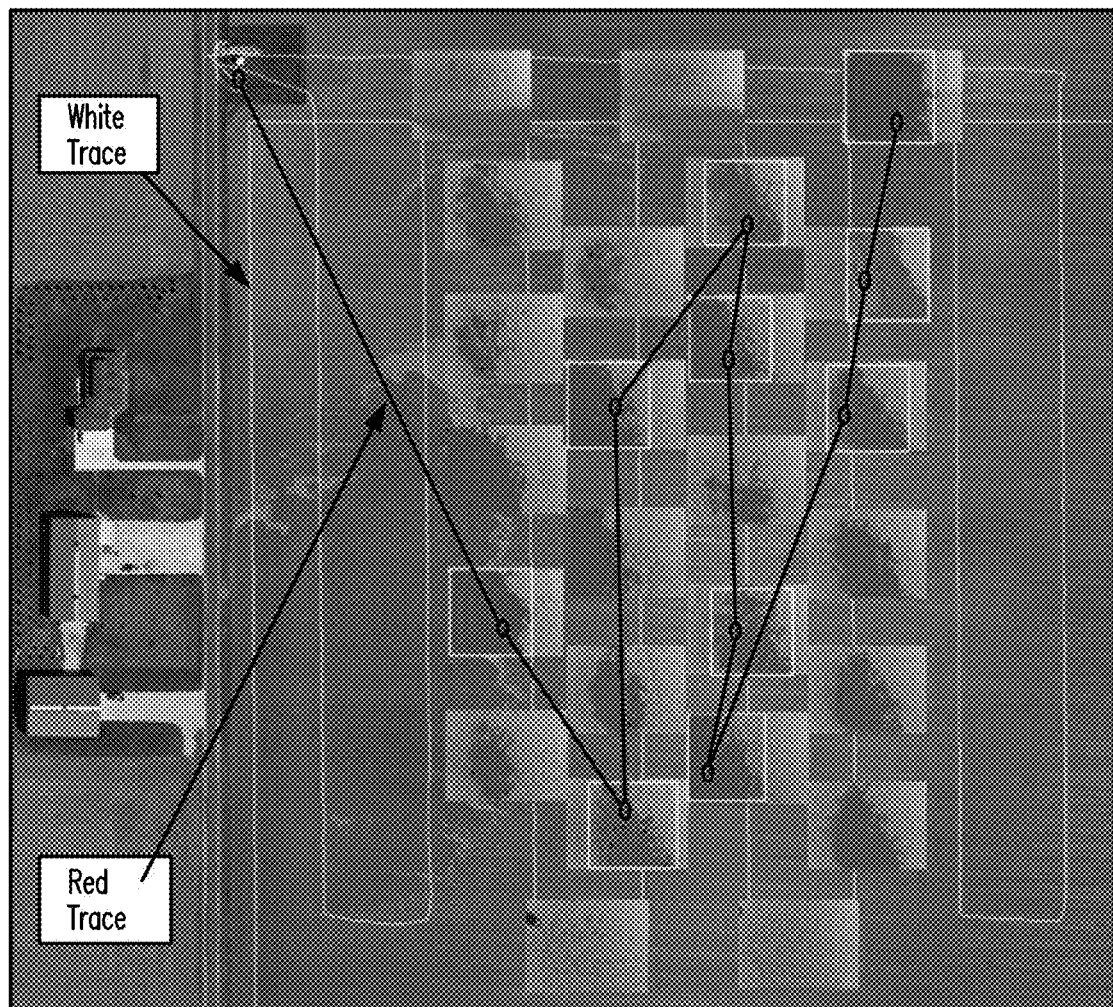
FIG. 6 depicts results of the exemplary method on sample data from a soybean farm near Ogden IL. The white trace shows the stage-1 grid path. A total of 26 interesting areas were found, their locations and associated figures are shown on the path. The red trace shows the algorithmically planned stage-2 path where the UAS visits 10 of the interesting areas to obtain close-up images. This methodology can be implemented on mobile devices and can result in an optimized stage-2 mission plan.

In the first stage of the mission, the aircraft can perform an automated grid-pattern based scan from about 100 feet above ground level and records images with a 10% area overlap. The images can be transmitted to the app on a mobile device using functionality already available on leading consumer UAS, including, but not limited to, 3DR Solo and DJI Phantom. Using algorithms developed above, potential interesting areas are identified from the transmitted images. The software then automatically plans a path in the second stage of the mission to take high-resolution close-up images of the interesting areas from about 30 to 50 feet. FIG. 6 depicts a generated flight-path solution on an example dataset obtained at a Soybean farm near Ogden, Illinois. The dataset consisted of images recorded during the stage-1 grid path. The image analysis and stage-2 path planning was done using the exemplary algorithms, but post-flight. The image analysis and path planning algorithms can be within a tablet app for complete on-site execution. In FIG. 6, the white trace shows the stage-1 grid path. A total of 20 interesting areas were found, their locations and associated figures are shown on the path. The red trace shows the stage-2 path that was created by our preliminary path planning algorithm where the UAS visits 10 of the interesting areas to obtain closeup images.

The path-planning algorithms can be further designed to optimize the mission plan such that a maximum number of interesting images are obtained within the flight endurance of the UAS. The waypoints can be designed such that the UAS can start from the end point of the high altitude grid survey, reduce altitude for acquiring close-up pictures, and return to the original launch point at the end of this second stage of the mission. Such a path planning problem can be cast as that of searching for the least-cost Hamiltonian path that visits a pre-specified number of the identified interesting locations. Solutions to Hamiltonian path planning problems are NP-complete [34, 35], hence, heuristics such as distribution of waypoints in different parts of the field can be utilized to further speed up the solution times. Such approximations have been known to significantly improve the computational speeds for UAS applications [36].

Additionally, the algorithm development can implement the ability to use altitude between 30 to 50 feet as a control variable to attempt to capture each interesting location in one image where possible. This approach is utilized to minimize cost and weight of incorporating a camera with an optical zoom, however, when a camera with real-time control of optical zoom is available under at comparable prices to the GoPro hero (around $400), the software can be easily modified.

Example 4. Tablet Application and User-Interface Development

The application can have an interface where the grower has minimum parameter selection or tuning to do which will improve productivity. Accordingly, the workflow can have three main stages. In a one-time "SETUP", the agronomist can draw the boundaries of a field using a drag-and-draw interface overlaid on mapping systems, such as Google maps using available APIs. The second stage of the workflow, "SURVEY," can be execution of the monitoring flight. In this stage, the agronomist presses the FLY button on the app after having setup the UAS. The app can automatically plan the flight path based on the field boundaries, execute the first stage of the two-stage adaptive mission described above, then transmit the imagery back to the app for processing, and get an updated mission plan for the second stage of the mission. The third stage of the workflow, "INSPECTION," can present the grower with, for example, about 10 close-up images. Here, the agronomist will provide a thumbs up or down feedback on each close-up image before moving to the next image. In addition, the agronomist can also record text or voice notes about each image. The agronomist will have the ability to view and tag any of the images taken by the UAS after this stage. All images from the mission can be overlaid on the map in the appropriate location. Based on user feedback, the application can be altered to make it more user-friendly and aesthetic.

Example 5. First Comparative Test

Figure 11:
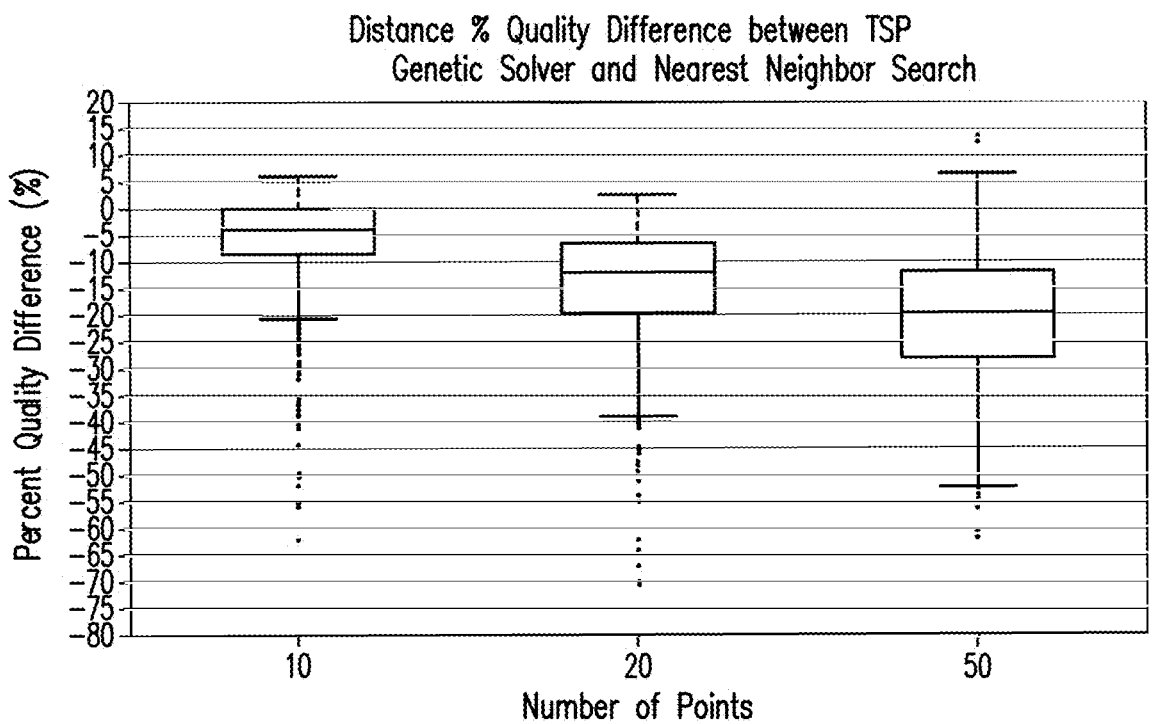
FIG. 11 illustrates Percent Quality Difference of Distance of Flight Path between TSP Genetic Solver and Nearest Neighbor Search For 10, 20, 50 Uniformly Distributed Points.
Figure 12:
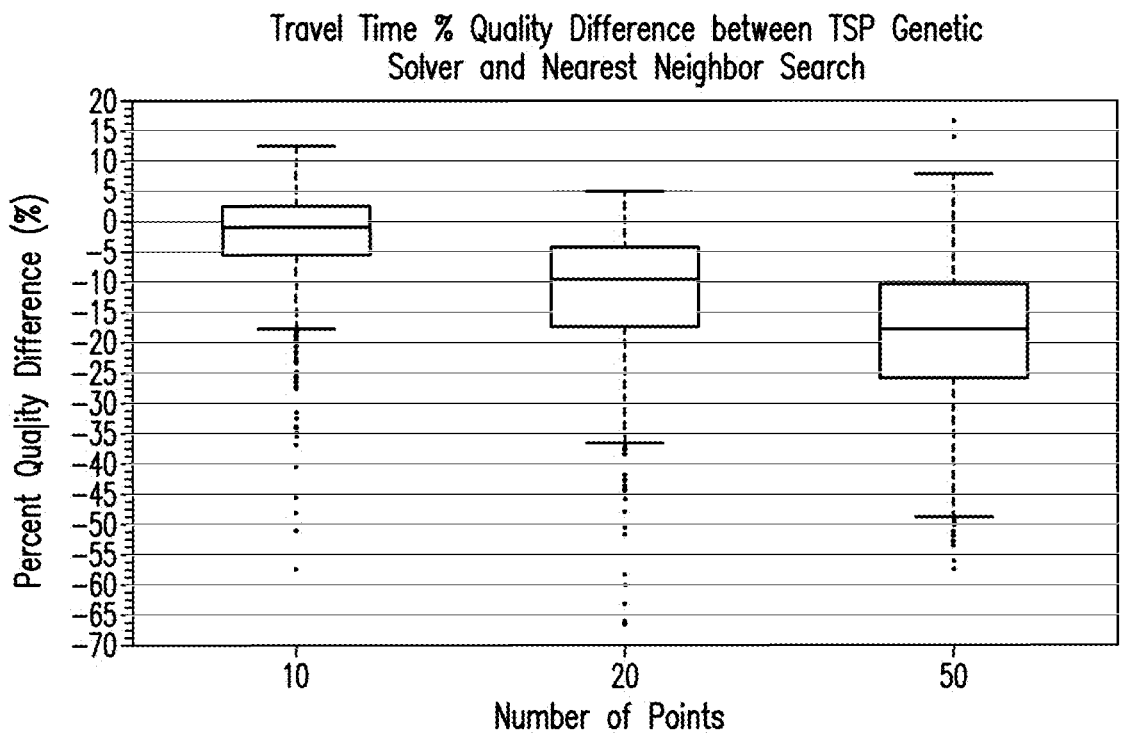
FIG. 12 illustrates Percent Quality Difference of Travel Time between TSP Genetic Solver and Nearest Neighbor Search for 10, 20, and 50 Uniformly Distributed Points.
Figure 13:
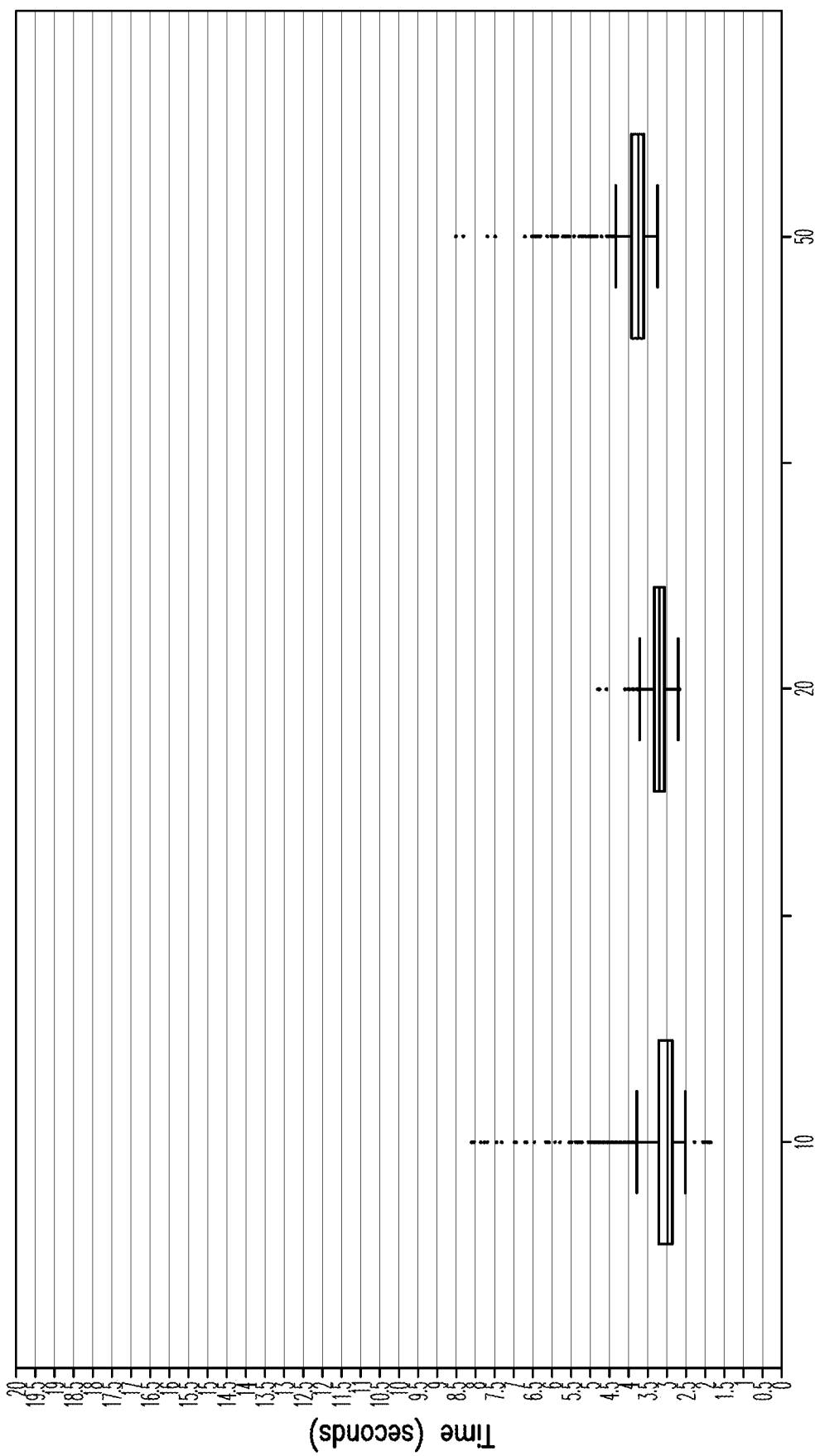
FIG. 13 illustrates Computation time in seconds of the Genetic Solver for the Traveling Salesman Problem (TSP) for 10, 20, and 50 Uniformly Distributed Points.
Figure 14:
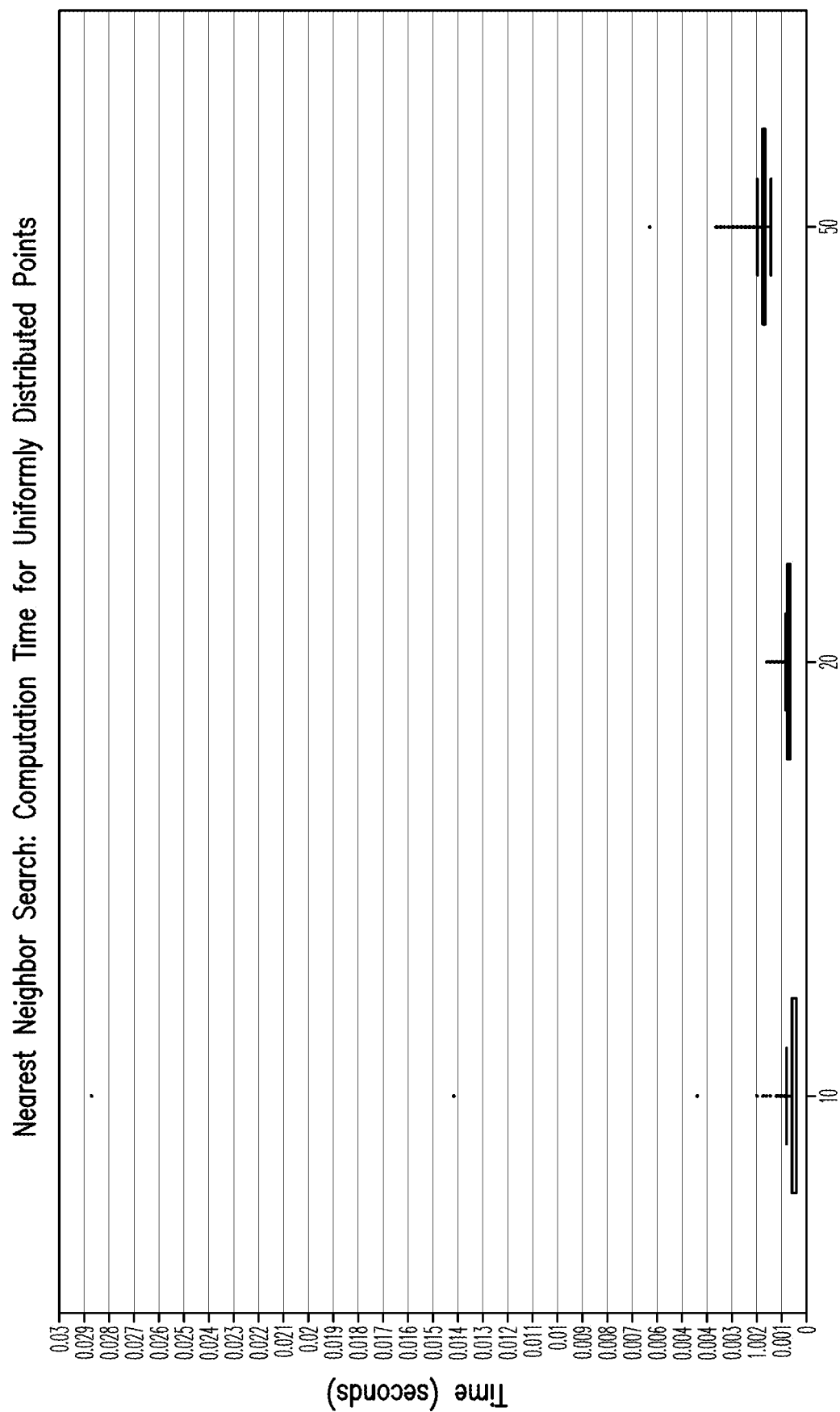
FIG. 14 illustrates Computation time in seconds of the Nearest Neighbor Algorithm for 10, 20, and 50 Uniformly Distributed Points.

Observing FIG. 11, the genetic solver yielded shorter routes than the nearest neighbor search with average computation times of 3.2236, 3.2245, and 3.8332 seconds on average for 10, 20, and 50 points with some outliers greater than 6 seconds (see FIG. 13). However, the nearest-neighbor algorithm's solution has an average computation time in the hundredths and millionths of seconds (see FIG. 14) for 10, 20, and 50 points. This resulted in instances where the total travel time along the path from the genetic solver's solution was equal to or longer (see FIG. 12) than that of nearest neighbor search's solution. At only 10 points, the genetic solver's solution yielded a shorter travel time 57% of the time. As the number of points increased, the genetic solver becomes substantially superior to the nearest neighbor search with the travel time of the genetic solver's solution being shorter than the nearest neighbor solution 92.8% and 96.8% of the time for 20 and 50 points respectively. FIG. 13 illustrates Computation time in seconds of the Genetic Solver for the Traveling Salesman Problem (TSP) for 10, 20, and 50 Uniformly Distributed Points.

Genetic Solver Parameter Analysis

Figure 15:
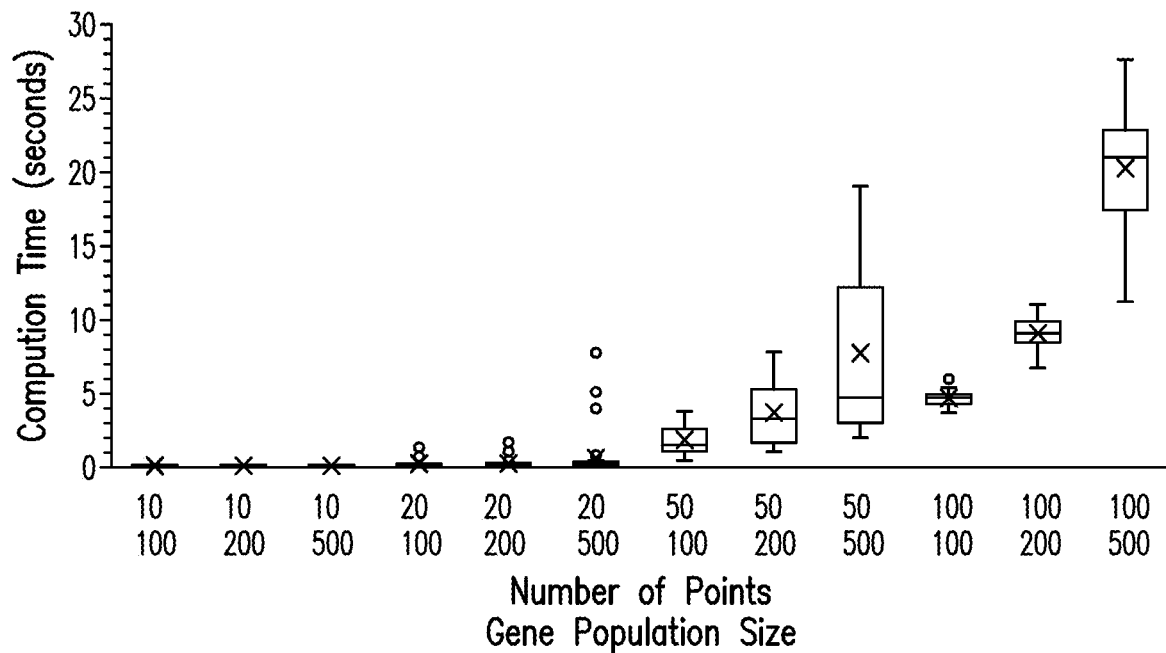
FIG. 15 illustrates Computation time for each combination of population size and number of points with only the minimum iterations needed are used for each respective rep.
Figure 16:
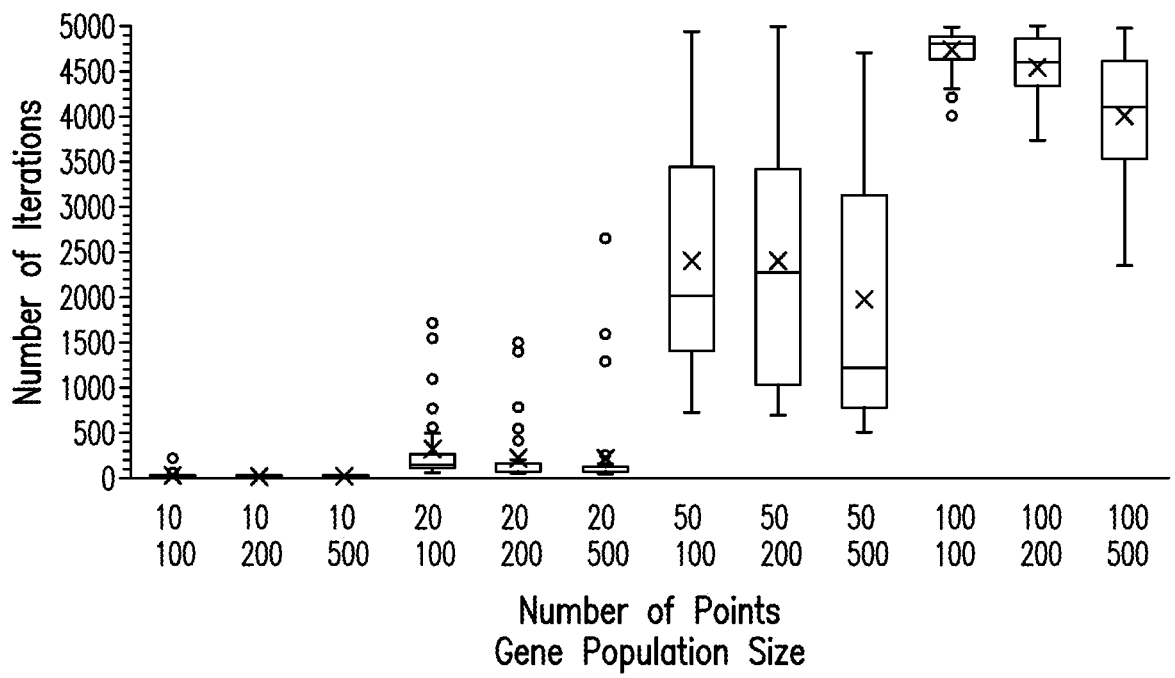
FIG. 16 illustrates Minimum Iterations necessary for solver to converge on a solution for each combination of Population Sizes and Number of Points.

The genetic solver was used to solve the Traveling Salesman Problem for 10, 20, and 50 points with population sizes of 100, 200, and 500. As seen in FIG. 16 the amount of iterations necessary for the solver to converge on a solution increases with the number of points. However, as the population size increases, the amount of minimum iterations needed decreases. This decrease is noticeable, but not significant enough to affect the total computation time and resulting travel time. FIG. 15 displays the computation time (if minimum iterations are used) for the combinations of Population Sizes and Number of Points. For each number of points, the computation time is almost always the least at a population size of 100.

The largest concern is the effect of population size and iterations on travel time. The percent quality difference in travel time between each respective set of points with different population sizes is described herein. This was determined by comparing the respective travel time (Distance/5 assuming the UAV travels at 5 m/s) of each rep of points with different population sizes for the same set of points.

This is calculated as:

$$\frac{T(V_{NP}) - \min(T(V_{NP})}{\min(T(V_{NP}))}$$

where T is the Travel Time for a given combination V of N number of points and population size of P.

Figure 17:
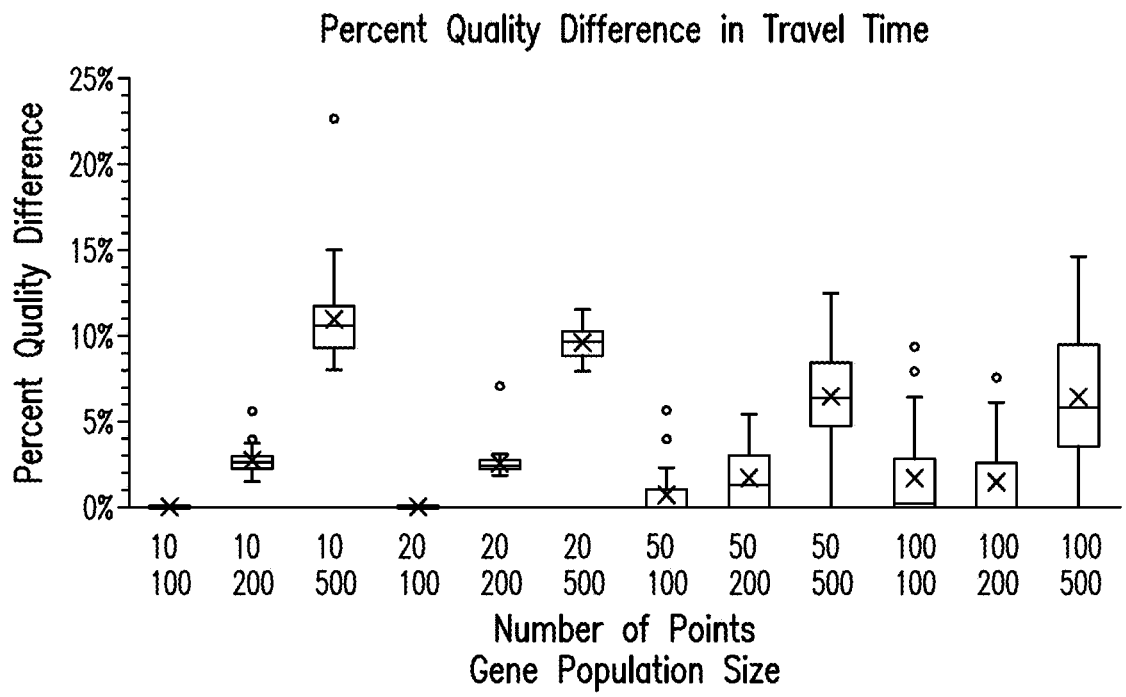
FIG. 17 illustrates Percent Quality Difference in Travel Time between different combinations of Gene population size and the number of points.
Figure 18:
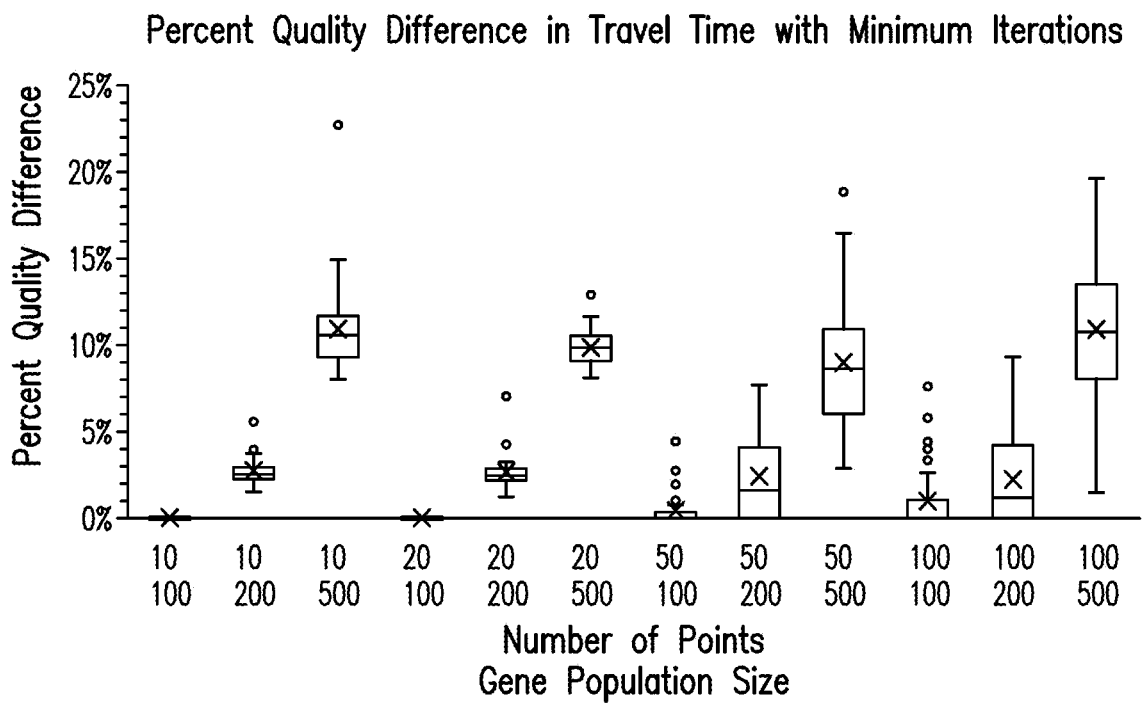
FIG. 18 illustrates Percent Quality Difference in Travel Time between different combinations of Gene population size and the number of points with only the minimum amount of iterations for each respective rep.

FIG. 17 shows that every instance where the population of 100 was used, its respective travel time was the least compared to that of the same points with population sizes of 200 and 500. Looking at the hypothetical percent quality difference where the minimum amount of iterations is used in each instance (see FIG. 18) this is still true for a majority of the repetitions.

From this it seems that it would be most optimal to use a gene population size of 100. For reducing computation time via controlling the number of iterations, the following was added to the Genetic Solver:

For N<10 points, I(iterations)=500

For 10≥N<15, I=1000

For 15≥N<30, I=3000

For N≥30, I=5000

This was done based off the results obtained in FIG. 16, but still arbitrarily assigned to also account for potential outliers.

Below is shown Table 1: Comparison of travel time and distance in Original Genetic Path Planning Algorithm and Nearest Neighbor Search Algorithm for sets of 10, 20, and 50 points.

| | Travel Time PQD | | | Distance PQD | | | NN Comp Time | | | GA Comp Time | | |
|---|---|---|---|---|---|---|---|---|---|---|---|---|
| # Pts | 10 | 20 | 50 | 10 | 20 | 50 | 10 | 20 | 50 | 10 | 20 | 50 |
| Max | 57.30% | 66.41% | 57.32% | 62.31% | 70.55% | 61.53% | 2.87E−2 | 1.63E−3 | 6.27E−3 | 18.54 | 4.79 | 8.51 |
| UOB | 17.50% | 36.56% | 49.06% | 20.94% | 39.32% | 52.24% | 8.43E−4 | 8.83E−4 | 2.00E−3 | 3.79 | 3.71 | 4.35 |
| Q3 | 5.53% | 17.23% | 25.75% | 8.51% | 19.72% | 28.12% | 6.09E−4 | 7.92E−4 | 1.79E−3 | 3.23 | 3.33 | 3.89 |
| Q2 | 6.91% | 9.55% | 17.62% | 3.91% | 12.03% | 19.68% | 4.77E−4 | 7.61E−4 | 1.71E−3 | 2.97 | 3.21 | 3.73 |
| Q1 | −2.46% | 4.34% | 10.21% | 0.23% | 6.66% | 12.04% | 4.52E−4 | 7.31E−4 | 1.64E−3 | 2.86 | 3.08 | 3.59 |
| LOB | −14.43% | −15.00% | −13.10% | −12.20% | −12.94% | −12.08% | 2.18E−4 | 6.39E−4 | 1.43E−3 | 2.31 | 2.70 | 3.15 |

| | Travel Time PQD | | | Distance PQD | | | NN Comp Time | | | GA Comp Time | | |
|---|---|---|---|---|---|---|---|---|---|---|---|---|
| # Pts | 10 | 20 | 50 | 10 | 20 | 50 | 10 | 20 | 50 | 10 | 20 | 50 |
| MIN | −11.01% | 10.27% | 11.71% | −5.60% | 10.49% | 11.95% | 4.00E−4 | 8.97E−5 | 3.16E−4 | 1.85 | 0.21 | 0.49 |
| AVG | 3.09% | 11.74% | 18.64% | 6.22% | 14.24% | 20.76% | 6.05E−4 | 7.73E−4 | 1.78E−3 | 3.22 | 3.22 | 3.83 |
| StDev | 8.06% | 10.27% | 11.71% | 8.15% | 10.49% | 11.95% | 1.01E−3 | 8.97E−5 | 3.16E−4 | 0.87 | 0.21 | 0.49 |

Distance and travel times were compared by using percent quality difference between the respective values of the Nearest Neighbor Search and the Genetic Path Solver. Percent quality difference (PDQ) is calculated as (xobserved−xreference)/xreference where xreference is the value of the variable for the Genetic Path Solver in this situation.

Second Comparison Analysis

Figure 19:
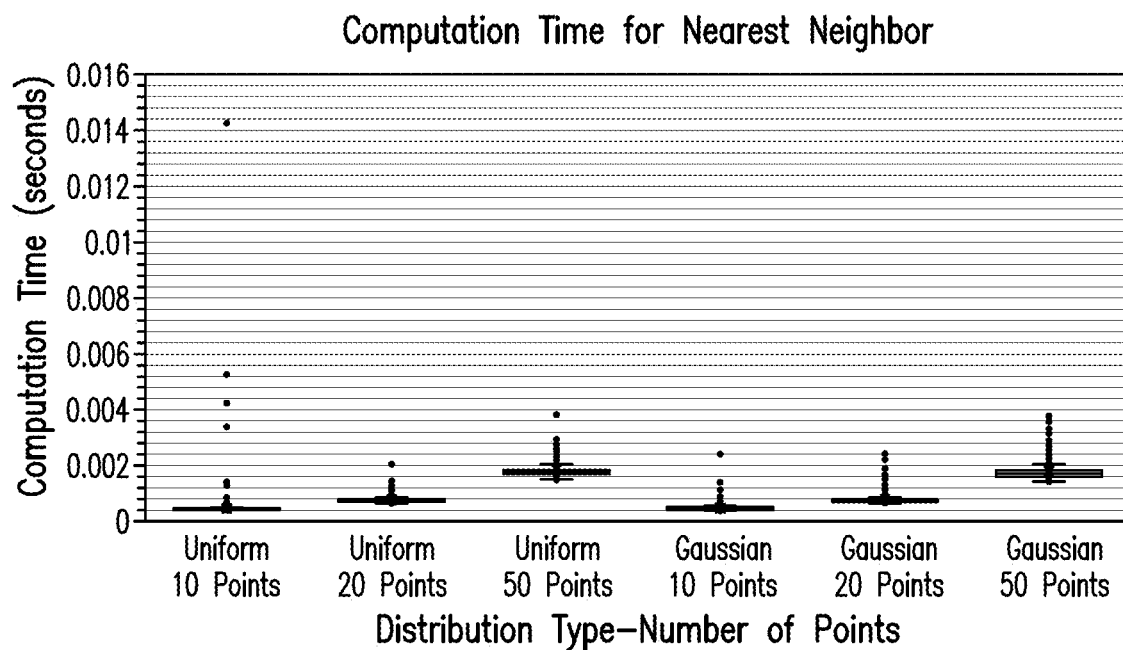
FIG. 19 illustrates Computation time for the Nearest Neighbor Search Algorithm for points distributed along Uniform and Gaussian distributions in the Second Comparison Analysis.
Figure 20:
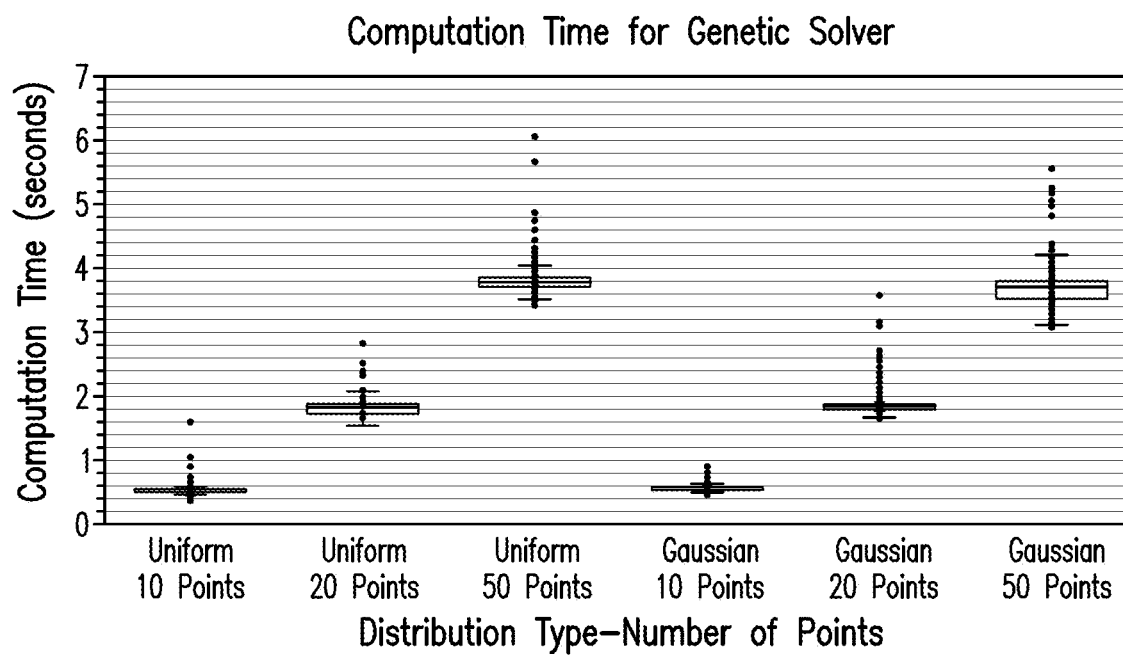
FIG. 20 illustrates Computation time for the Genetic Solver of the Traveling Salesman Problem for points distributed along Uniform and Gaussian distributions in the Second Comparison Analysis.
Figure 21:
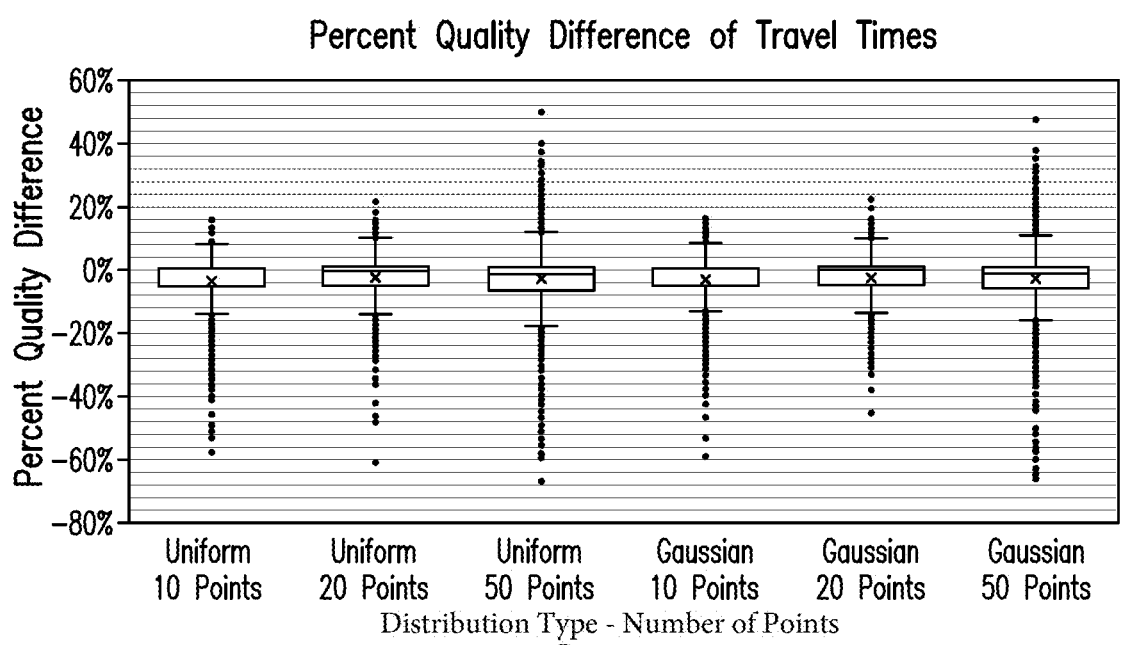
FIG. 21 illustrates Percent Quality Difference between the Travel Time of the routes from the Genetic Solver and the Nearest Neighbor Search in the Second Comparison Analysis.

With the modified genetic solver, another comparison analysis was performed to compare the genetic solver and the nearest neighbor solution. Comparing the computation time of the genetic solver from the first and second comparison analysis in FIG. 20 and FIG. 13, the distributions remain roughly the same from the first to the second analysis. The percent quality difference in travel times differs in the second test compared to the previous test. FIG. 19 illustrates Computation time for the Nearest Neighbor Search Algorithm for points distributed along Uniform and Gaussian distributions in the Second Comparison Analysis.

In one or more embodiments, the current iteration of the path-planning algorithm can run a nearest-neighbor search as an initial guess of a sub-optimal path for the genetic solver. If the genetic solver computation time lasts longer than the predicted benefit in travel time from its solution, then the nearest-neighbor algorithm can be executed as the flight path if it yields a more optimal travel time than the current solution the genetic solver has determined.

In one or more embodiments, the genetic solver algorithm can be stopped after it has improved past the Nearest Neighbor Search's solution by a defined percentage. In another embodiment, tracking can be performed (and utilized for controlling execution of the algorithm) for how many iterations it takes for each improvement in the path length to occur.

Figure 22:
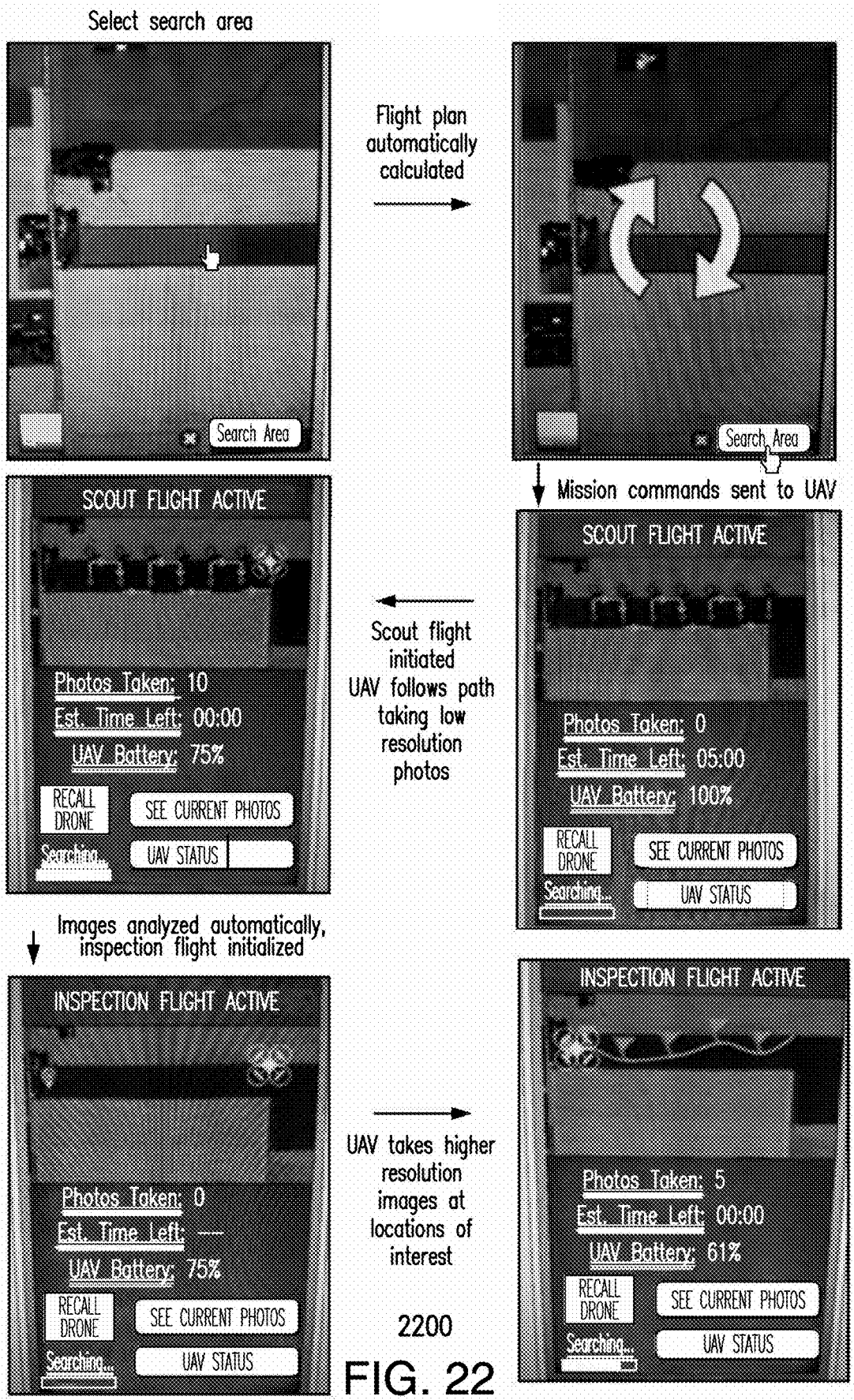
FIG. 22 illustrates a workflow showing the user interface of an exemplary embodiment for monitoring of unstructured environments.

In FIG. 22, one embodiment of a workflow showing a user interface 2200 of an exemplary embodiment for monitoring of unstructured environments. The workflow enables selection of a search area, automated flight, and status updates regarding images captured and other parameters of the UAV. The workflow further enables the second automated flight, and status updates regarding target images captured and other parameters of the UAV.

Figure 23:
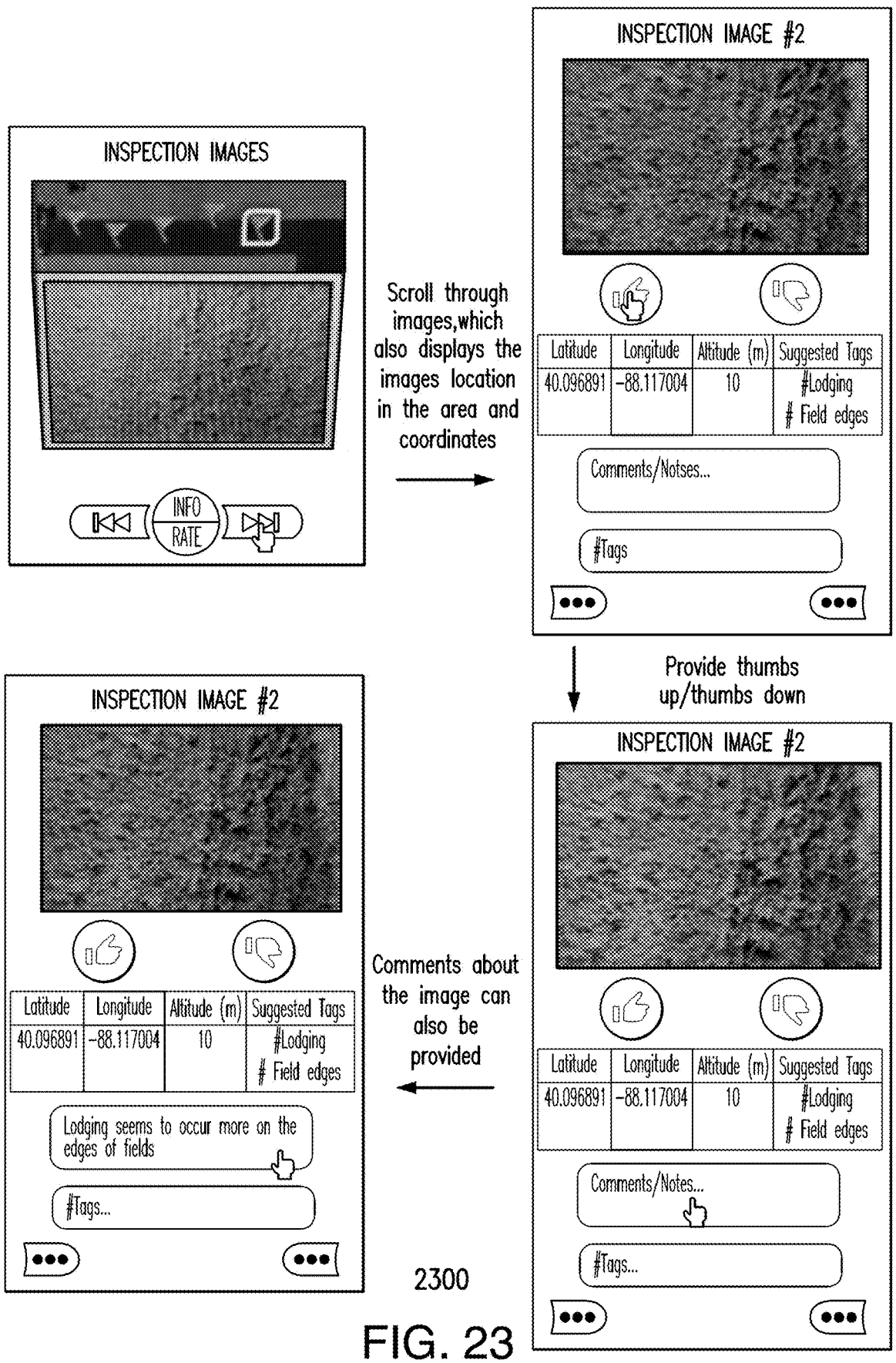
FIG. 23 illustrates a workflow showing ability of a user to provide feedback of an exemplary embodiment for monitoring of unstructured environments.

FIG. 23 illustrates a workflow showing ability of a user to provide feedback via a user interface 2300 of an exemplary embodiment for monitoring of unstructured environments. The workflow enables scrolling through captured images, information regarding captured image location, selection or ranking or approval (e.g. a thumbs-up icon) of the images, and inputting specific comments regarding each image.

Figure 24:
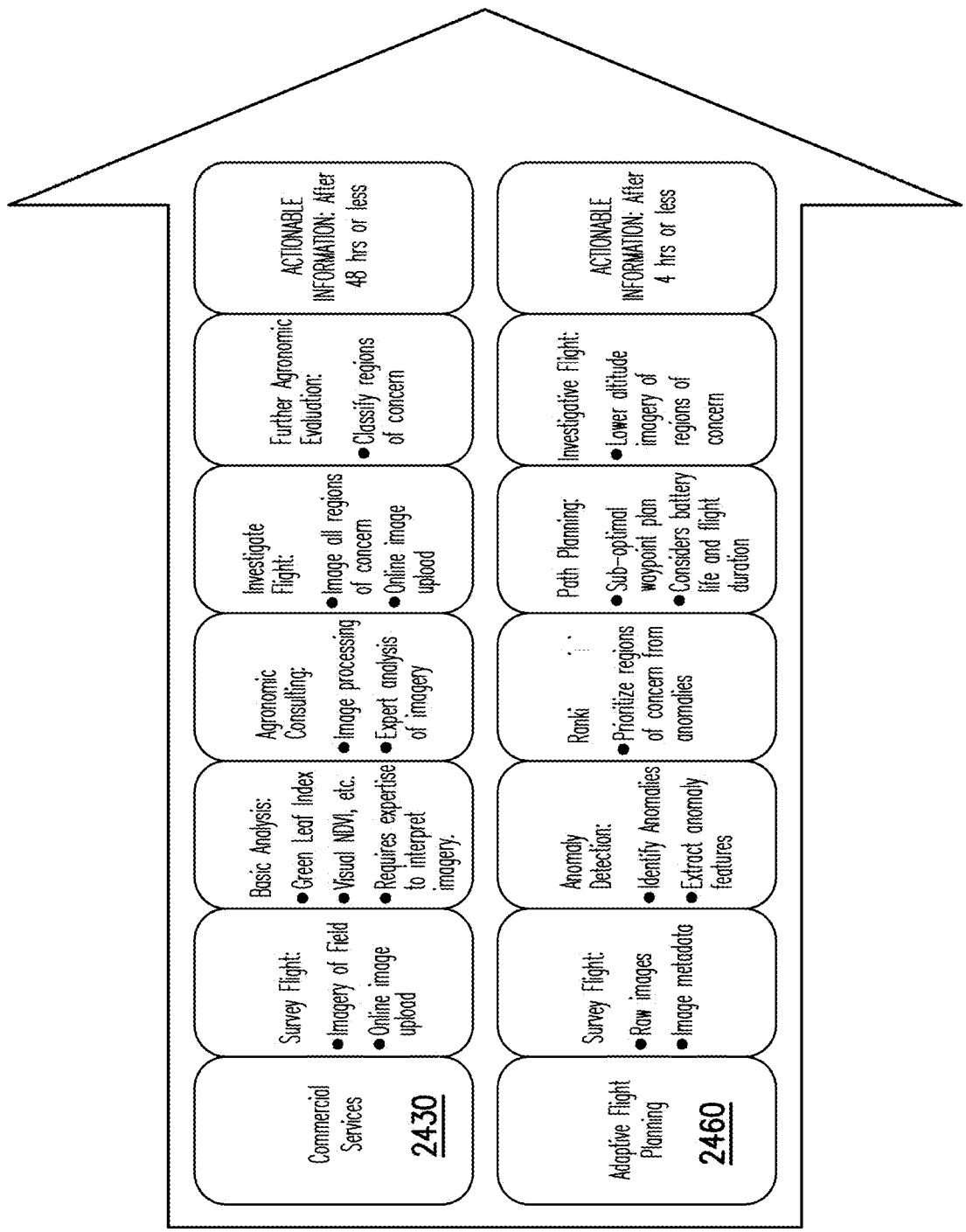
FIG. 24 illustrates a comparison between a commercial service workflow and a workflow showing ability of a user to provide feedback of an exemplary embodiment for monitoring of unstructured environments.

FIG. 24 illustrates a comparison between a commercial service workflow 2430 and a workflow 2460 showing ability of a user to provide feedback of an exemplary embodiment for monitoring of unstructured environments. As can be seen from FIG. 24, the adaptive flight planning methodology 2460 enables anomaly detection, heuristic ranking, automated path planning, and faster data acquisition of higher quality, among other features.

In one or more embodiments, the first and second stages of the image acquisition can occur in a single flight. For instance, the same UAV during a single flight can acquire images along a first high-altitude path, analyze the images to determine the regions of interest, obtain user feedback regarding the images, generate a second flight path for the regions of interest, and capture high-resolution images of the regions of interest along the second path prior to landing.

In one or more embodiments, multiple unmanned vehicles (e.g., aircraft and/or ground vehicles) can be utilized for performing the exemplary method. The multiple unmanned vehicles can be the same (e.g., having the same capabilities for one or more of flight, image capture, data acquisition, communication, processing resources and so forth) or can be different (e.g., having different capabilities for one or more of flight (speed and/or altitude), image capture, data acquisition, communication, processing resources and so forth).

In one embodiment, a high-flying UAV can be utilized for high-altitude image capturing and one or more low-flying UAVs can be used for low-altitude image capturing. In this example, some or each of the high- and low-altitude UAVs can have different image capturing devices suited for their particular altitude(s). In one embodiment, the UAVs can communicate with each other to provide the second flight plan. For example, the high-flying UAV can be utilized for high-altitude image capturing and processing of the images to generate a second flight plan. The second flight plan can be wirelessly communicated from the high-flying UAV to the one or more low-flying UAVs which can then follow the second flight plan (or a portion thereof if multiple low-flying UAVs are being utilized) to capture low-altitude images of the regions of interest. In one or more embodiments, the image processing, user communication and/or flight path generation can be performed by a single UAV (e.g., the high-flying UAV captures/processes high altitude images, obtains user feedback, generates/communicates a second flight plan to low-flying UAVs, receives high-resolution images from the low-flying UAVs, and performs any additional image processing and obtaining of user feedback) or can be performed by more than one of the UAVs (e.g., the high-flying UAV captures/processes high altitude images, obtains user feedback, generates/communicates a second flight plan to one or more low-flying UAVs, and then the low-flying UAV captures high-resolution images along the second flight plan and performs any additional image processing and obtaining of user feedback).

In one or more embodiments, multiple flight plans can be automatically generated to be flown by the same UAV or different UAVs. For example, a high-flying UAV can capture/process high altitude images, obtain user feedback, and generate/communicate a second flight plan to a medium-flying UAV. The medium-flying UAV can capture/process medium altitude images along the second path, obtain user feedback, and generate/communicate a third flight plan to a low-flying UAV. The low-flying UAV can capture/process low altitude images along the third flight path, and provide any addition image processing/obtaining user feedback. Any number of flight paths at any number of altitudes performed by any number of UAVs can be done in this embodiment. In this example, the different sets of images can have different parameters, such as different resolution. In this example, the different flight plans can be utilized for different types of data collection, including different types of images such as IR images and so forth. In this example, some or all of the different flight plans can be at different altitudes or can be at the same altitude. For instance, a fourth flight plan can be generated according to regions of interest determined from processing the high-resolution images by the low-flying UAV. The fourth flight plan can be at the same altitude as the third flight plan but utilizes different data acquisition devices (e.g., different types of cameras), such as capturing color images along the third flight plan and capturing IR images along the fourth flight plan.

In one or more embodiments, the multiple unmanned vehicles performing the method can include a UAV and an autonomous ground vehicle. For example, a high-flying UAV can capture/process high altitude images, obtain user feedback, and generate/communicate a second flight plan to a low-flying UAV. The low-flying UAV can capture/process medium altitude images along the second path, obtain user feedback, and generate/communicate a third path to a ground vehicle. The ground vehicle can capture/process ground images or other data along the third path, and provide any addition image processing/obtaining user feedback. In one embodiment, the third path can be a flight plan that is converted to a ground path, such as by one of the UAVs and/or by the ground vehicle.

In one or more embodiments, different flight plans or paths can be generated that provide for capturing images of the same regions of interest by different vehicle (e.g., UAVs and/or autonomous ground vehicles). In this embodiment, the different flight plans or paths will enable multiple sets of images for the same region of interest(s) to provide for a more robust data capture process.

In one or more embodiments, the unmanned vehicle(s) (e.g., UAVs and/or autonomous ground vehicles) can be used in conjunction with a manned vehicle to perform the method, such as a high-altitude flight for high-altitude image capturing being flown by a manned aircraft and low-altitude flights for low-altitude image capturing being flown by an unmanned aircraft. In one or more embodiments, the image processing and/or flight plan generation can be performed in a distributed environment which may be limited to the UAVs or be performed in whole or in part by other computing devices, such as a tablet of the user that is providing feedback for the captured images. For example, captured images can be wirelessly transmitted to the tablet so that the tablet can analyze the images, determine regions of interest and generate a second flight plan.

In one or more embodiments, different techniques can be utilized for determining regions of interest including techniques that perform different analysis of the images and/or techniques that analyze different types of data.

In one or more embodiments, a system for monitoring unstructured environments is provided. The system includes a base station comprising a first central processing unit (CPU) and configured to plan and transmit a flight path of one or more unmanned aerial vehicles (UAV) as the one or more UAVs fly along the flight path above a predetermined area. The system can use a second CPU of the UAV to capture a plurality of initial images of the area to gain complete coverage of the area under observation at a lower spatial resolution as the UAV flies along the flight path and transmitting the plurality of initial images to the first CPU. The system can use the first CPU to transform the images from RGB colorspace to alternative colorspace and analyze the images to automatically identify contiguous areas within the images that deviate from the average of the images that represents anomalous places within the predetermined area to identify one or more agronomically anomalous target areas. The system can use the first CPU to assign precise geolocations to the one or more agronomically anomalous target areas and transmit an updated flight path to the second CPU of the UAV directing the UAV to the one or more agronomically anomalous target areas. The system can use the second CPU of the UAV, in response to receiving the identification of one or more anomalous target areas, to automatically cause the UAV to capture one or more additional high resolution images of the one or more target areas. The system can transmit the plurality of initial images and the one or more additional high resolution images to the first CPU.

The system can display high resolution images that overlay at the right geolocation to the viewer. The high resolution images can be overlayed at their appropriate geolocation and displayed to a user. The first CPU can execute an application performing these functions. The system can collect feedback from the user. The feedback from the user can be selected from text, audio, thumbs up or thumbs down and combination thereof. The feedback can be annotations related to the image including potential causes of the anomalies such as textual annotations or audio recordings.

The system can execute training of machine learning algorithms to automatically identify specific causes of anomalies from visual and other contextual information. The contextual information can be selected from time, location, and crop field history. The flight path can be modified and/or updated dynamically while the UAV is in flight.

The data captured by the second CPU of the UAV can be captured, transmitted and displayed in real time to the first CPU. The plurality of initial images can be collected by a camera designed to record electromagnetic radiation of about 300 nm to about 700 nm. The system can include a multi-spectral or hyper-spectral imager.

The plurality of initial images collected can have about a 5% to about a 20% area overlap. The plurality of initial images collected can have about a 10% area overlap.

The plurality of initial images of the area have a resolution about 5 cm/pixel to about 20 cm/pixel. The alternative colorspace can be selected from hue-saturation-value (HSV) and multispec sensors. The alternative colorspace image can be examined to identify locations that have different spectral signatures from the average. A grid search of blocks of images is performed on the alternative colorspace image. The grid search of the blocks of images can occur in about a 100×100 matrix.

The spectral signatures of the plurality of initial images can be analyzed. The first CPU can identify and classify clusters of image pixels by distinction and form multiple groupings. The first CPU can plan and alter the flight path based on the remaining battery life of the UAV and the anomalous index of potential target areas. One or more additional high resolution images can be in a range of about 0.1 cm/pixel to about 2 cm/pixel.

In one or more embodiments, a processing system (including at least one processor) can obtain a plurality of first images of an area that is captured by a camera of a UAV as the UAV flies over the area, wherein the plurality of first images is at a first spatial resolution. The processing system can analyze at least one initial image of the plurality of first images to automatically identify a target area that deviates from a determination of an average of the plurality of first images that represents an anomalous place within the area to identify one or more agronomically anomalous target areas. The processing system can assign geolocations to the one or more agronomically anomalous target areas. The processing system can generate an updated flight path according to the assigning of the geolocations, wherein the updated flight path directs the UAV to the one or more agronomically anomalous target areas. The processing system can obtain at least one second image of the one or more agronomically anomalous target areas that is captured by the camera of the UAV as the UAV flies along the updated flight path, where the at least one second image is at a second spatial resolution which is higher than the first spatial resolution. The processing system can be located on the UAV. The processing system can be located on a mobile device that is in wireless communication with the UAV, where the processing system wirelessly transmits the updated flight path to the UAV, where the plurality of first images and the at least one second image are captured by the camera of the UAV during a single flight of the UAV, and where the obtaining of the plurality of first images and the at least one second image by the processing system is via wireless communications with the UAV. The analyzing can include transforming the at least one of the plurality of first images from RGB colorspace to alternative colorspace. The alternative colorspace can be selected from hue-saturation-value (HSV) or multispectral. The processing system can perform a grid search of blocks of images in the alternative colorspace.

In one or more embodiments a method can include obtaining, by a processing system including at least one processor of an unmanned vehicle, a predetermined path, where the predetermined path is determined according to an assignment of geolocations to one or more agronomically anomalous target areas, where the one or more agronomically anomalous target areas are determined according to an analysis of a plurality of first images that automatically identifies a target area that deviates from a determination of an average of the plurality of first images that represents an anomalous place within a predetermined area, where the plurality of first images of the predetermined area are captured by a camera during a flight over the predetermined area, and where the plurality of first images is at a first spatial resolution. The method can include causing, by the processing system, the unmanned vehicle to follow the predetermined path. The method can include capturing, by the processing system via a camera of the unmanned vehicle, at least one second image of the one or more agronomically anomalous target areas as the unmanned vehicle travels along the predetermined path, where the at least one second image is at a second spatial resolution which is higher than the first spatial resolution.

The analysis of the plurality of first images can include transforming at least one of the plurality of first images from RGB colorspace to alternative colorspace, where the alternative colorspace is selected from hue-saturation-value (HSV) or multispectral. The unmanned vehicle can be a ground vehicle, and the plurality of first images of the predetermined area can be captured by the camera of an unmanned aerial vehicle during the flight over the predetermined area. The unmanned vehicle can be a low-flying unmanned aerial vehicle, and the plurality of first images of the predetermined area can be captured by the camera of a high-flying unmanned aerial vehicle during the flight over the predetermined area. The predetermined path can be determined by a mobile device in wireless communication with the processor of the unmanned vehicle, where the one or more agronomically anomalous target areas are determined by the mobile device. The at least one second image can be overlayed at an appropriate geolocation and displayed to a user. The feedback can be collected from a user, and the feedback can be associated with the plurality of first images, the at least one second image, or a combination thereof. The feedback from the user can be selected from text, audio, thumbs up or thumbs down, or a combination thereof. The feedback from the user can include annotations including potential causes of anomalies. Machine learning algorithms can be trained to automatically identify specific causes of anomalies.

Figure 25:
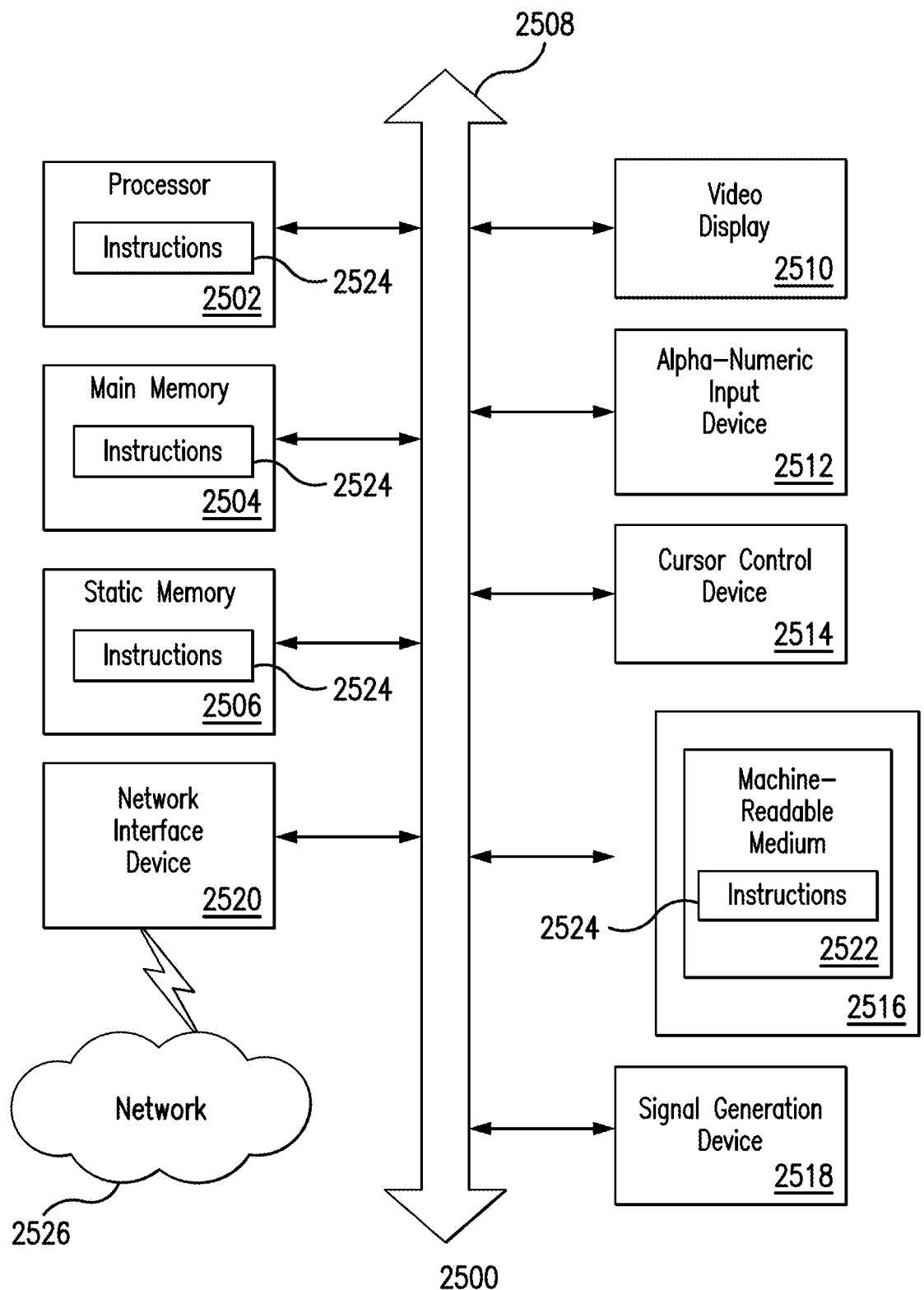
FIG. 25 is a diagrammatic representation of a machine in the form of a computer system within which a set of instructions, when executed, may cause the machine to perform any one or more of the methods described herein.

FIG. 25 depicts an exemplary diagrammatic representation of a machine in the form of a computer system 2500 within which a set of instructions, when executed, may cause the machine to perform any one or more of the methods described above. One or more instances of the machine can operate, for example, to perform all or portions of the workflow of FIGS. 1, 22 and 23 and workflow 2460 of FIG. 24.

In some embodiments, the machine may be connected (e.g., using a network 2526) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 2500 may include a processor (or controller) 2502 (e.g., a central processing unit (CPU)), a graphics processing unit (GPU, or both), a main memory 2504 and a static memory 2506, which communicate with each other via a bus 2508. The computer system 2500 may further include a display unit 2510 (e.g., a liquid crystal display (LCD), a flat panel, or a solid state display). The computer system 2500 may include an input device 2512 (e.g., a keyboard), a cursor control device 2514 (e.g., a mouse), a disk drive unit 2516, a signal generation device 2518 (e.g., a speaker or remote control) and a network interface device 2520. In distributed environments, the embodiments described in the subject disclosure can be adapted to utilize multiple display units 2510 controlled by two or more computer systems 2500. In this configuration, presentations described by the subject disclosure may in part be shown in a first of the display units 2510, while the remaining portion is presented in a second of the display units 2510.

The disk drive unit 2516 may include a tangible computer-readable storage medium 2522 on which is stored one or more sets of instructions (e.g., software 2524) embodying any one or more of the methods or functions described herein, including those methods illustrated above. The instructions 2524 may also reside, completely or at least partially, within the main memory 2504, the static memory 2506, and/or within the processor 2502 during execution thereof by the computer system 2500. The main memory 2504 and the processor 2502 also may constitute tangible computer-readable storage media.

Dedicated hardware implementations including, but not limited to, application specific integrated circuits, programmable logic arrays and other hardware devices can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable gate array. Furthermore, software implementations (e.g., software programs, instructions, etc.) including, but not limited to, distributed processing or component/object distributed processing, parallel processing, or virtual machine processing can also be constructed to implement the methods described herein. Distributed processing environments can include multiple processors in a single machine, single processors in multiple machines, and/or multiple processors in multiple machines. It is further noted that a computing device such as a processor, a controller, a state machine or other suitable device for executing instructions to perform operations or methods may perform such operations directly or indirectly by way of one or more intermediate devices directed by the computing device.

While the tangible computer-readable storage medium 2522 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure. The term "non-transitory" as in a non-transitory computer-readable storage includes without limitation memories, drives, devices and anything tangible but not a signal per se.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. The exemplary embodiments can include combinations of features and/or steps from multiple embodiments. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

Less than all of the steps or functions described with respect to the exemplary processes or methods can also be performed in one or more of the exemplary embodiments. Further, the use of numerical terms to describe a device, component, step or function, such as first, second, third, and so forth, is not intended to describe an order or function unless expressly stated so. The use of the terms first, second, third and so forth, is generally to distinguish between devices, components, steps or functions unless expressly stated otherwise. Additionally, one or more devices or components described with respect to the exemplary embodiments can facilitate one or more functions, where the facilitating (e.g., facilitating access or facilitating establishing a connection) can include less than every step needed to perform the function or can include all of the steps needed to perform the function.

In one or more embodiments, a processor (which can include a controller or circuit) has been described that performs various functions. It should be understood that the processor can be multiple processors, which can include distributed processors or parallel processors in a single machine or multiple machines. The processor can be used in supporting a virtual processing environment. The virtual processing environment may support one or more virtual machines representing computers, servers, or other computing devices. In such virtual machines, components such as microprocessors and storage devices may be virtualized or logically represented. The processor can include a state machine, application specific integrated circuit, and/or programmable gate array including a Field PGA. In one or more embodiments, when a processor executes instructions to perform "operations", this can include the processor performing the operations directly and/or facilitating, directing, or cooperating with another device or component to perform the operations.

Figure 26A:
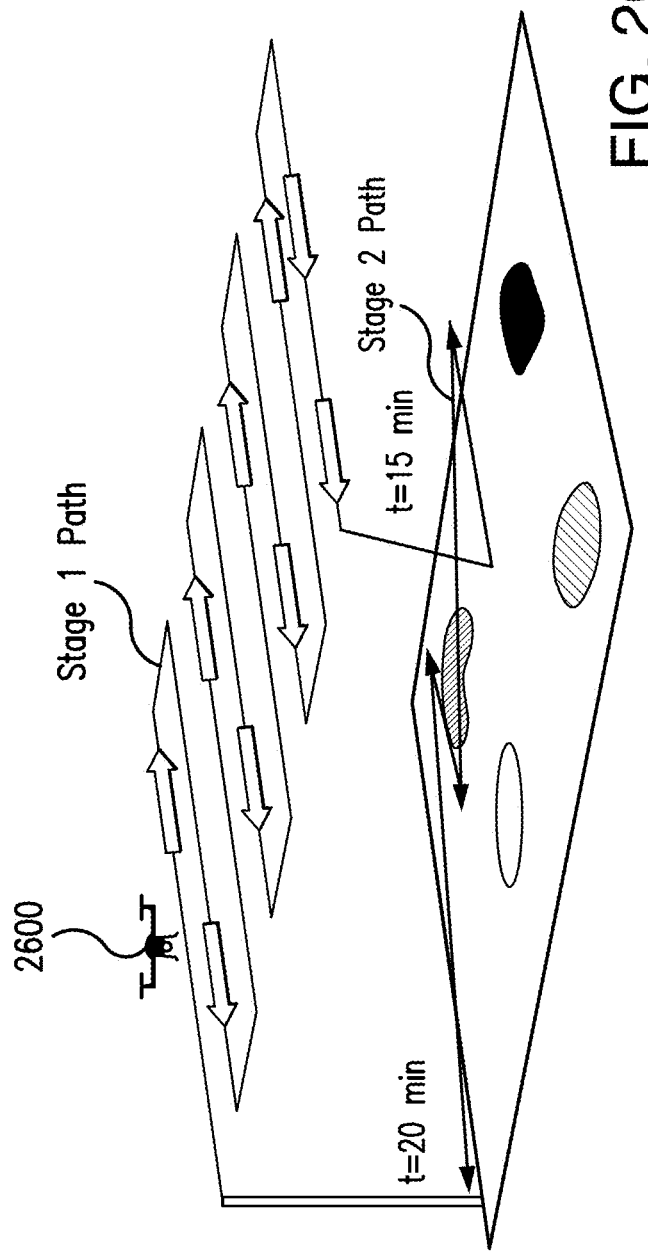
FIGS. 26A, B, and C illustrate the first and second flight paths for an unmanned aerial vehicle according to an embodiment for a field-monitoring method including an overview of the predetermined area and images of detected anomalous areas.
Figure 26C:
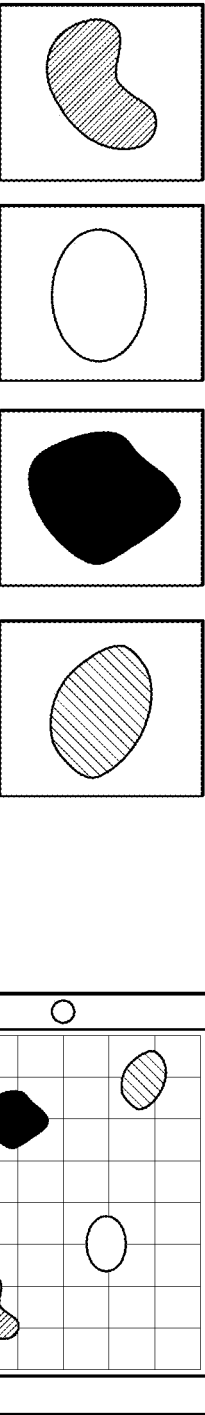
Figure 26B:
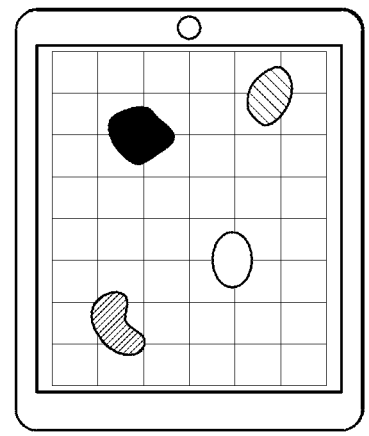

FIG. 26A illustrates an embodiment where a first flight path is followed by a UAV 2600 to capture images of a predetermined area (FIG. 26B). The images are then processed and analyzed according to one or more of the exemplary embodiments described herein in order to generate the second flight plan so as to enable capturing of close-up (e.g. high-resolution) images of anomalous areas (FIG. 26C). Various time frames can be used for the different flight paths such as a longer time for the first flight path and a shorter time for the second flight path. In one embodiment, the first flight path (e.g., high altitude) can be a uniform flight path intended to cover an entire predetermined area whereas the second flight path (e.g., low altitude) can be non-uniform intended to cover the specific anomalous area of the entire predetermined area.

REFERENCES

[1] Richard Szeliski. Image alignment and stitching: A tutorial. Foundations and Trends® in Computer Graphics and Vision, 2(1):1-104, 2006.

[2] S. Leprince, S. Barbot, F. Ayoub, and J. P. Avouac. Automatic and Precise Orthorectification, Coregistration, and Subpixel Correlation of Satellite Images, Application to Ground Deformation Measurements. IEEE Transactions on Geoscience and Remote Sensing, 45(6):1529-1558, June 2007.

[3] Jorge Torres-Sánchez, Francisca López-Granados, Ana Isabel De Castro, and José Manuel Peña-Barragán. Configuration and specifications of an unmanned aerial vehicle (UAV) for early site specific weed management. PLoS One, 8(3):e58210, 2013.

[4] C. Rey, M. P. Martín, A. Lobo, I. Luna, M. P. Diago, B. Millan, and J. Tardáguila. Multispectral imagery acquired from a UAV to assess the spatial variability of a Tempranillo vineyard. In John V. Stafford, editor, Precision agriculture '13, pages 617-624. Wageningen Academic Publishers, 2013. DOI: 10.3920/978-90-8686-778-3 76.

[5] Chenghai Yang. Hyperspectral Imagery for Mapping Crop Yield for Precision Agriculture. In Bosoon Park and Renfu Lu, editors, Hyperspectral Imaging Technology in Food and Agriculture, Food Engineering Series, pages 289-304. Springer New York, 2015. DOI: 10.1007/978-1-4939-2836-1 12.

[6] Won Suk Lee. Plant Health Detection and Monitoring. In Bosoon Park and Renfu Lu, editors, Hyperspectral Imaging Technology in Food and Agriculture, Food Engineering Series, pages 275-288. Springer New York, 2015. DOI: 10.1007/978-1-4939-2836-1 11.

[7] D. Moshou, D. Kateris, X.-E. Pantazi, and I. Gravalos. Crop and weed species recognition based on hyperspectral sensing and active learning. In John V. Stafford, editor, Precision agriculture '13, pages 555-561. Wageningen Academic Publishers, 2013. DOI: 10.3920/978-90-8686-778-3 68.

[8] M. Rinaldi, J. Llorens, and E. Gil. Electronic characterization of the phenological stages of grapevine using a LIDAR sensor. In John V. Stafford, editor, Precision agriculture '13, pages 603-609. Wageningen Academic Publishers, 2013. DOI: 10.3920/978-90-8686-778-3 74.

[9] D. Andújar, H. Moreno, C. Valero, R. Gerhards, and H. W. Griepentrog. Weed-crop discrimination using LiDAR measurements. In John V. Stafford, editor, Precision agriculture '13, pages 541-545. Wageningen Academic Publishers, 2013. DOI: 10.3920/978-90-8686-778-3 66.

[10] A. Matese, F. Capraro, J. Primicerio, G. Gualato, S. F. Di Gennaro, and G. Agati. Mapping of vine vigor by UAV and anthocyanin content by a non-destructive fluorescence technique. In Precision agriculture'13, pages 201-208. Springer, 2013.

[11] M. Teena and A. Manickavasagan. Thermal Infrared Imaging. In Annamalai Manickavasagan and Hemantha Jayasuriya, editors, Imaging with Electromagnetic Spectrum, pages 147-173. Springer Berlin Heidelberg, 2014. DOI: 10.1007/978-3-642-54888-8 8.

[12] M. Meron, V. Alchanatis, Y. Cohen, and J. Tsipris. Aerial thermography for crop stress evaluation—a look into the state of the technology. In Precision agriculture'13, pages 177-183. Springer, 2013.

[13] P. J. Curran and M. D. Steven. Multispectral Remote Sensing for the Estimation of Green Leaf Area Index [and Discussion]. Philosophical Transactions of the Royal Society of London A: Mathematical, Physical and Engineering Sciences, 309(1508):257— 270, July 1983.

[14] R. S. Defries and J. R. G. Townshend. NDVI-derived land cover classifications at a global scale. International Journal of Remote Sensing, 15(17):3567-3586, November 1994.

[15] Joe Mari J. Maja, Todd Campbell, Joao Camargo Neto, and Philip Astillo. Predicting cotton yield of small field plots in a cotton breeding program using UAV imagery data. In SPIE Commercial+ Scientific Sensing and Imaging, pages 98660C-98660C. International Society for Optics and Photonics, 2016.

[16] Ryo Sugiura, Shogo Tsuda, Seiji Tamiya, Atsushi Itoh, Kentaro Nishiwaki, Noriyuki Murakami, Yukinori Shibuya, Masayuki Hirafuji, and Stephen Nuske. Field phenotyping system for the assessment of potato late blight resistance using RGB imagery from an unmanned aerial vehicle. Biosystems Engineering, 148:1-10, 2016.

[17] D. Zermas, D. Teng, P. Stanitsas, M. Bazakos, D. Kaiser, V. Morellas, D. Mulla, and N. Papanikolopoulos. Automation solutions for the evaluation of plant health in corn fields. In 2015 IEEE/RSJ International Conference on Intelligent Robots and Systems (IROS), pages 6521-6527, September 2015.

[18] Pauli J. Komi, Mike R. Jackson, and Rob M. Parkin. Plant classification combining colour and spectral cameras for weed control purposes. In 2007 IEEE International Symposium on Industrial Electronics, pages 2039-2042. IEEE, 2007.

[19] Lorenz Meier, J F Camacho, B Godbolt, J Goppert, L Heng, M Lizarraga, et al. Mavlink: Micro air vehicle communication protocol. Online]. Tillgänglig: http://qgroundcontrol.org/mavlink/start. [Hämtad 2014-05-22], 2013.

[20] R. C. Grande, T. J. Walsh, G. Chowdhary, S. Ferguson, and J. P. How. Online regression for data with changepoints using gaussian processes and reusable models. IEEE Transactions on Neural Networks and Learning Systems, PP(99):1-14, 2016.

[21] Brian Kulis and Michael I Jordan. Revisiting k-means: New algorithms via bayesian nonparametrics. In Proceedings of the 29th International Conference on Machine Learning (ICML-12), pages 513-520, 2012.

[22] Isabelle Philipp and Thomas Rath. Improving plant discrimination in image processing by use of different colour space transformations. Computers and electronics in agriculture, 35(1):1-15, 2002.

[23] Jonas Fernandes da Silva, Alisson V Brito, Helder Nogueira de Moura, et al. An embedded system for aerial image processing from unmanned aerial vehicles. In 2015 Brazilian Symposium on Computing Systems Engineering (SBESC), pages 154-157. IEEE, 2015.

[24] Luis F Gonzalez, Glen A Montes, Eduard Puig, Sandra Johnson, Kerrie Mengersen, and Kevin J Gaston. Unmanned aerial vehicles (uays) and artificial intelligence revolutionizing wildlife monitoring and conservation. Sensors, 16(1):97, 2016.

[25] Jacopo Primicerio, Salvatore Filippo Di Gennaro, Edoardo Fiorillo, Lorenzo Genesio, Emanuele Lugato, Alessandro Matese, and Francesco Primo Vaccari. A flexible unmanned aerial vehicle for precision agriculture. Precision Agriculture, 13(4):517-523, 2012.

[26] M Govender, K Chetty, and H Bulcock. A review of hyperspectral remote sensing and its application in vegetation and water resource studies. Water Sa, 33(2), 2007.

[27] George Alan Blackburn. Hyperspectral remote sensing of plant pigments. Journal of experimental botany, 58(4):855-867, 2007.

[28] Allan Axelrod, Girish Chowdhary, and Sertac Karaman. Efficiently informed exploration between isolated operatives. In Conference on Decisions and Control, Osaka, Japan, 2015. IEEE. Submitted.

[29] Allan Axelrod and Girish Chowdhary. Uninformed-to-informed exploration in unstructured real-world environments. In Self-Confidence In Autonomous Systems, Washington D.C., USA, 2015. AAAI.

[30] Allan Axelrod and Girish Chowdhary. The Explore-Exploit Dilemma in Nonstationary Decision Making under Uncertainty, chapter The Explore-Exploit Dilemma in Nonstationary Decision Making under Uncertainty. 2198-4182. Springer international publishing, 1 edition, 2015.

[31] Nazim Kemal Ure, Girish Chowdhary, Jonathan P. How, Mathew Vavarina, and John Vian. Health aware planning under uncertainty for uav missions with heterogeneous teams. In Proceedings of the European Control Conference, Zurich, Switzerland, July 2013.

[32] Allan Axelrod and Girish Chowdhary. Adaptive algorithms for autonomous dataferrying in nonstationary environments. In Aerospace Science and Technology Forum, Kissimmee, FL, 2015. AIAA.

[33] Rakshit Allamaraju, Hassan Kingravi, Allan Axelrod, Girish Chowdhary, Robert Grande, Christopher Crick, Weihua Sheng, and Jonathan How. Human aware path planning in urban environments with nonstationary mdps. In International Conference on Robotics and Automation, Hong Kong, China, 2014. IEEE.

[34] Michael R Gary and David S Johnson. Computers and intractability: A guide to the theory of np-completeness, 1979.

[35] K E Trummel and J R Weisinger. Technical note—the complexity of the optimal searcher path problem. Operations Research, 34(2):324-327, 1986.

[36] Kaarthik Sundar and Sivakumar Rathinam. Algorithms for routing an unmanned aerial vehicle in the presence of refueling depots. IEEE Transactions on Automation Science and Engineering, 11(1):287-294, 2014.

[37] Alborz Geramifard, Thomas J. Walsh, Stefanie Tellex, Girish Chowdhary, Nicholas Roy, and Jonathan P. How. A tutorial on linear function approximators for dynamic programming and reinforcement learning. Foundations and Trends® in Machine Learning, 6(4): 375-451, 2013.

[38] Girish Chowdhary, Miao Liu, Robert C. Grande, Thomas J. Walsh, Jonathan P. How, and Lawrence Cain. Off-Policy Reinforcement Learning with Gaussian Processes. Acta Automatic Sinica (to appear), 2014.

[39] N. Kemal Ure, Alborz Geramifard, Girish Chowdhary, and Jonathan P. How. Adaptive Planning for Markov Decision Processes with Uncertain Transition Models via Incremental Feature Dependency Discovery. In European Conference on Machine Learning (ECML), 2012.

[40] Trevor Campbell, Sameera S. Ponda, Girish Chowdhary, and Jonathan P. How. Planning under uncertainty using nonparametric bayesian models. In AIAA Guidance, Navigation, and Control Conference (GNC), August 2012.

[41] G. Chowdhary, H. A. Kingravi, J. P. How, and P. A. Vela. Bayesian nonparametric adaptive control using gaussian processes. Neural Networks and Learning Systems, IEEE Transactions on, PP(99):1-1, 2014.

[42] Hassan Kingravi, Harshal Maske, and Girish Chowdhary. Kernel observers: Systems theoretic modeling and inference of spatiotemporally varying processes. In Advances in Neural Information Processing Systems (NIPS), Barcelona, Spain, 2016. accepted.

[43] H. A. Kingravi, H. Maske, and G. Chowdhary. Kernel controllers: A systems-theoretic approach for data-driven modeling and control of spatiotemporally evolving processes. In 2015 54th IEEE Conference on Decision and Control (CDC), pages 7365-7370, December 2015.

[44] Rob Leclerc. Agtech investing report. Technical report, AgFunder, August 2016.

The invention claimed is:

1. A system for monitoring environments, the system comprising:
   a base station comprising a first processing system including at least one first processor; and
   an unmanned aerial vehicle (UAV) comprising a second processing system including at least one second processor, wherein the UAV is in communication with the base station,
   wherein the second processing system of the UAV is configured to capture a plurality of initial images of a predetermined area to obtain coverage of the predetermined area at a lower spatial resolution as the UAV flies along a flight path, wherein the flight path for the UAV is above the predetermined area, and wherein the second processing system of the UAV is configured to transmit the plurality of initial images to the first processing system of the base station,
   wherein the first processing system of the base station is configured to analyze the at least one of the plurality of initial images to automatically identify areas within the at least one of the plurality of initial images that deviate from a determination of an average of the plurality of initial images and that represent anomalous places within the predetermined area to identify a plurality of agronomically anomalous target areas, and wherein the plurality of agronomically anomalous target areas together comprise a set of agronomically anomalous target areas,
wherein the first processing system of the base station is configured to select one or more of the agronomically anomalous target areas of the set to form a subset of one or more agronomically anomalous target areas, wherein a number of agronomically anomalous target areas in the set is larger than is in the subset, wherein each agronomically anomalous target area in the subset is selected by the first processing system of the base station as a result of that agronomically anomalous target area being larger than at least one agronomically anomalous target area of the set that is excluded from the subset, and wherein the first processing system of the base station is configured to transmit an updated flight path to the second processing system of the UAV directing the UAV to the one or more agronomically anomalous target areas of the subset, and
wherein the second processing system of the UAV is configured to, in response to receiving identification of the one or more agronomically anomalous target areas of the subset, automatically cause the UAV to capture one or more additional high resolution images of the one or more agronomically anomalous target areas of the subset.

2. The system of claim 1, wherein the first processing system of the base station is configured to examine the at least one of the plurality of initial images that has been transformed to an alternative colorspace to identify locations that have different spectral signatures from the average.

3. The system of claim 2, wherein the at least one of the plurality of initial images has been transformed from an RGB colorspace to the alternative colorspace, and wherein the alternative colorspace is selected from hue-saturation-value (HSV) or multispectral.

4. The system of claim 3, wherein the first processing system of the base station is configured to perform a grid search of blocks of images in the alternative colorspace.

5. A non-transitory computer-readable storage medium comprising executable instructions that, when executed by a processing system including at least one processor, perform operations comprising:
analyzing at least one initial image of a plurality of first images of an area to automatically identify a plurality of target areas, each of which deviates from a determination of an average of the plurality of first images and each of which represents an anomalous place within the area that is identified as an agronomically anomalous target area, the agronomically anomalous target areas collectively forming a set of agronomically anomalous target areas, and wherein the plurality of first images of the area are captured at a first spatial resolution;
selecting one or more of the agronomically anomalous target areas of the set to form a subset of one or more agronomically anomalous target areas, wherein a number of agronomically anomalous target areas in the set is larger than is in the subset, wherein each agronomically anomalous target area in the subset is selected as a result of that agronomically anomalous target area being larger than at least one agronomically anomalous target area of the set that is excluded from the subset; and
obtaining at least one second image of the one or more agronomically anomalous target areas of the subset that is captured by a camera of an unmanned vehicle as the unmanned vehicle moves along a path, wherein the path is generated according to the selecting of the subset, wherein the path directs the unmanned vehicle to the one or more agronomically anomalous target areas of the subset, and wherein the at least one second image is at a second spatial resolution which is higher than the first spatial resolution.

6. The non-transitory computer-readable storage medium of claim 5, wherein the processing system is located on the unmanned vehicle.

7. The non-transitory computer-readable storage medium of claim 5, wherein the unmanned vehicle is an unmanned aerial vehicle (UAV), wherein the processing system is located on a mobile device that is in wireless communication with the UAV, wherein the processing system wirelessly transmits an updated flight path to the UAV, wherein the plurality of first images and the at least one second image are captured by the camera during a single flight of the UAV, and wherein the obtaining of the plurality of first images and the at least one second image by the processing system is via wireless communications with the UAV.

8. The non-transitory computer-readable storage medium of claim 5, wherein the analyzing comprises transforming the at least one initial image of the plurality of first images from an RGB colorspace to an alternative colorspace.

9. The non-transitory computer-readable storage medium of claim 8, wherein the alternative colorspace is selected from hue-saturation-value (HSV) or multispectral.

10. The non-transitory computer-readable storage medium of claim 8, wherein the operations further comprise performing a grid search of blocks of images in the alternative colorspace.

11. The non-transitory computer-readable storage medium of claim 5, wherein the unmanned vehicle comprises an unmanned aerial vehicle.

12. The non-transitory computer-readable storage medium of claim 5, wherein the unmanned vehicle comprises an unmanned ground vehicle.

13. A method comprising:
obtaining, by a processing system including at least one processor of an unmanned vehicle, a predetermined path, wherein the predetermined path is determined according to:
an analysis of at least one initial image of a plurality of first images to automatically identify a plurality of target areas, each of which deviates from a determination of an average of the plurality of first images and each of which identifies an agronomically anomalous target area, wherein the agronomically anomalous target areas collectively form a set of agronomically anomalous target areas, and wherein the plurality of first images are captured at a first spatial resolution; and
a selection of one or more of the agronomically anomalous target areas of the set to form a subset of one or more agronomically anomalous target areas, wherein a number of agronomically anomalous target areas in the set is larger than is in the subset, wherein each agronomically anomalous target area in the subset is selected as a result of that agronomically anomalous target area being larger than at least one agronomically anomalous target area of the set that is excluded from the subset; and capturing, by the processing system via a camera of the unmanned vehicle, at least one second image of the one or more agronomically anomalous target areas of the subset as the unmanned vehicle is caused to travel along the predetermined path, wherein the at least one second image is at a second spatial resolution which is higher than the first spatial resolution;

wherein the analysis of the at least one initial image comprises transforming the at least one initial image from an RGB colorspace to an alternative colorspace; and wherein machine learning algorithms are trained to automatically identify specific causes of anomalies.

14. The method of claim 13, wherein the alternative colorspace is selected from hue-saturation-value (HSV) or multispectral.

15. The method of claim 13, wherein the unmanned vehicle is a ground vehicle, the plurality of first images are captured by an unmanned aerial vehicle, and the plurality of first images are captured by the unmanned aerial vehicle during a flight.

16. The method of claim 13, wherein the unmanned vehicle is a low-flying unmanned aerial vehicle, the plurality of first images are captured by a high-flying unmanned aerial vehicle, and the plurality of first images are captured by the high-flying unmanned aerial vehicle during a flight.

17. The method of claim 13, wherein the predetermined path is determined by a mobile device in wireless communication with the processor of the unmanned vehicle, and wherein the one or more agronomically anomalous target areas of the subset are determined by the mobile device.

18. The method of claim 13, wherein the at least one second image is overlayed at an appropriate geolocation and displayed to a user.

19. The method of claim 13, wherein:

feedback is collected from a user; and the feedback is associated with the plurality of first images, the at least one second image, or a combination thereof.

20. The method of claim 19, wherein the feedback from the user is selected from text, audio, thumbs up or thumbs down, or a combination thereof.

* * * * *